United States Patent
Nagata et al.

(10) Patent No.: US 7,913,175 B2
(45) Date of Patent: Mar. 22, 2011

(54) INFORMATION PROCESSING APPARATUS AND METHOD

(75) Inventors: Yasuyuki Nagata, Kanagawa (JP);
Hidenobu Takemura, Kanagawa (JP);
Tetsuya Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 707 days.

(21) Appl. No.: 10/398,042

(22) PCT Filed: Aug. 1, 2002

(86) PCT No.: PCT/JP02/07846
§ 371 (c)(1),
(2), (4) Date: Oct. 7, 2003

(87) PCT Pub. No.: WO03/012654
PCT Pub. Date: Feb. 13, 2003

(65) Prior Publication Data
US 2004/0066403 A1    Apr. 8, 2004

(30) Foreign Application Priority Data
Aug. 1, 2001    (JP) .................................. 2001-233325

(51) Int. Cl.
*G06F 3/00* (2006.01)
*G06F 3/01* (2006.01)

(52) U.S. Cl. ........ 715/752; 715/772; 715/783; 715/810; 715/838

(58) Field of Classification Search .................. 715/752, 715/805, 748, 821, 772, 783, 810, 838; 348/207.1, 348/211.7; 709/230
See application file for complete search history.

(56) References Cited

U.S. PATENT DOCUMENTS
| | | | |
|---|---|---|---|
| 5,724,155 A | 3/1998 | Saito | |
| 5,737,491 A * | 4/1998 | Allen et al. | 704/270 |
| 5,903,309 A * | 5/1999 | Anderson | 348/333.02 |

(Continued)

FOREIGN PATENT DOCUMENTS
DE    198 02 017    7/1999

(Continued)

OTHER PUBLICATIONS
Fuminori Ichikawa, "'Totte karaga Shobu!' no Degicame Katsuyo Technique", Nikkei Zero-One, Sep. 1, 2000. vol. 52, pp. 46, 47, 54 to 57.

(Continued)

*Primary Examiner* — Weilun Lo
*Assistant Examiner* — Nicholas Augustine
(74) *Attorney, Agent, or Firm* — Frommer Lawrence & Haug LLP; William S. Frommer

(57) ABSTRACT

The invention relates to an information processing apparatus and method which allow a user to readily select, upon transmission of an electronic mail or upon uploading of image data, image data of a plurality of images to be attached to the electronic mail or image data to be transmitted. The user uses a cross key and a determination button of an inputting section of a camcorder to operate an anchor 424 on an image selection screen 411 to operate a page backward feeding button 421 and a page feeding button 422 to select a thumbnail image displayed. In response to an operation of the user, the anchor 424 is positioned on the left side of the number of the thumbnail image designated by the user, and image data of the thumbnail image at which the anchor 424 is positioned are selected.

6 Claims, 35 Drawing Sheets

U.S. PATENT DOCUMENTS

| | | | | |
|---|---|---|---|---|
| 6,167,469 | A * | 12/2000 | Safai et al. | 710/62 |
| 6,252,588 | B1 * | 6/2001 | Dawson | 715/752 |
| 6,636,259 | B1 * | 10/2003 | Anderson et al. | 348/211.3 |
| 6,700,591 | B1 * | 3/2004 | Sharpe | 715/762 |
| 6,715,003 | B1 * | 3/2004 | Safai | 710/33 |
| 7,009,643 | B2 * | 3/2006 | Nakamura et al. | 348/231.4 |
| 7,009,725 | B2 * | 3/2006 | Miyanaga | 358/1.15 |
| 7,089,286 | B1 * | 8/2006 | Malik | 709/206 |
| 7,117,519 | B1 * | 10/2006 | Anderson et al. | 725/105 |
| 7,154,534 | B2 * | 12/2006 | Seki et al. | 348/207.1 |
| 2001/0032247 | A1 * | 10/2001 | Kanaya | 709/206 |
| 2001/0048774 | A1 * | 12/2001 | Seki et al. | 382/305 |
| 2002/0051223 | A1 * | 5/2002 | Izumi et al. | 358/402 |
| 2002/0069237 | A1 | 6/2002 | Ehara | |
| 2002/0199208 | A1 * | 12/2002 | Chang et al. | 725/131 |
| 2003/0103144 | A1 * | 6/2003 | Sesek et al. | 348/207.1 |
| 2004/0100508 | A1 * | 5/2004 | Hansson | 345/863 |

FOREIGN PATENT DOCUMENTS

| | | |
|---|---|---|
| EP | 0 889 635 | 1/1999 |
| JP | 9 305457 | 11/1997 |
| JP | 11-143803 | 5/1999 |
| JP | 2000-57067 | 2/2000 |
| JP | 2001 169023 | 6/2001 |
| JP | 2002-32302 | 1/2002 |
| JP | 2002-41891 | 2/2002 |
| WO | WO 99 38087 | 7/1999 |

OTHER PUBLICATIONS

Takahiro Toya, Technique of usage, Electronic mail part, File is attached!, Nikkei PC21 vol. 6 No. 15, Japan, Nikkei BP Nikkei Business Publications Inc., Aug. 1, 2001, vol. 6 No. 15, p. 189.

Reentry to Windows, Immediately convenient dictionary, Monthly Publication ASCII, PC vol. 3 No. 12, Japan, ASCII Co., Ltd., Dec. 1, 2000, vol. 3 No. 12, p. 38.

* cited by examiner

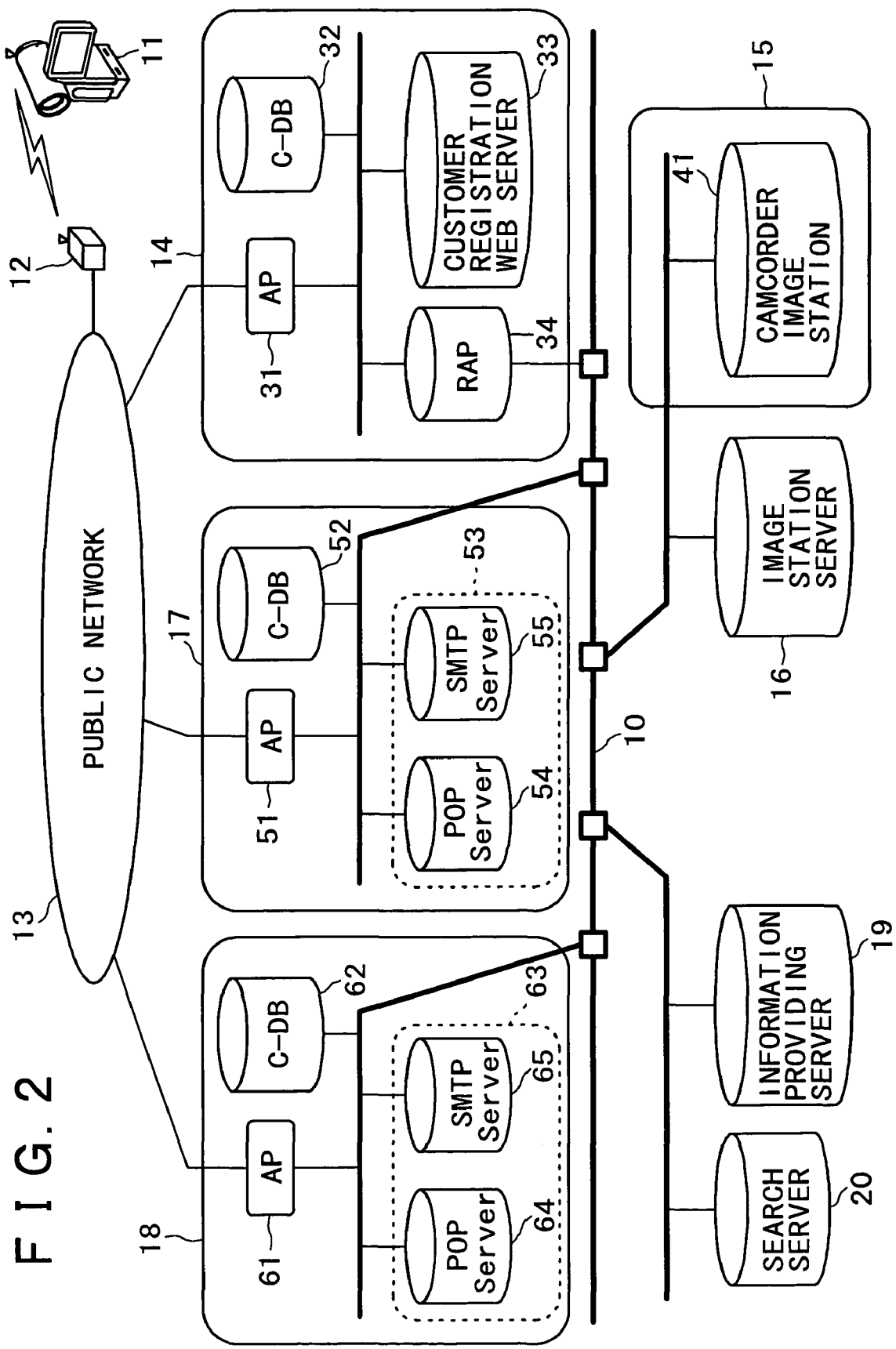

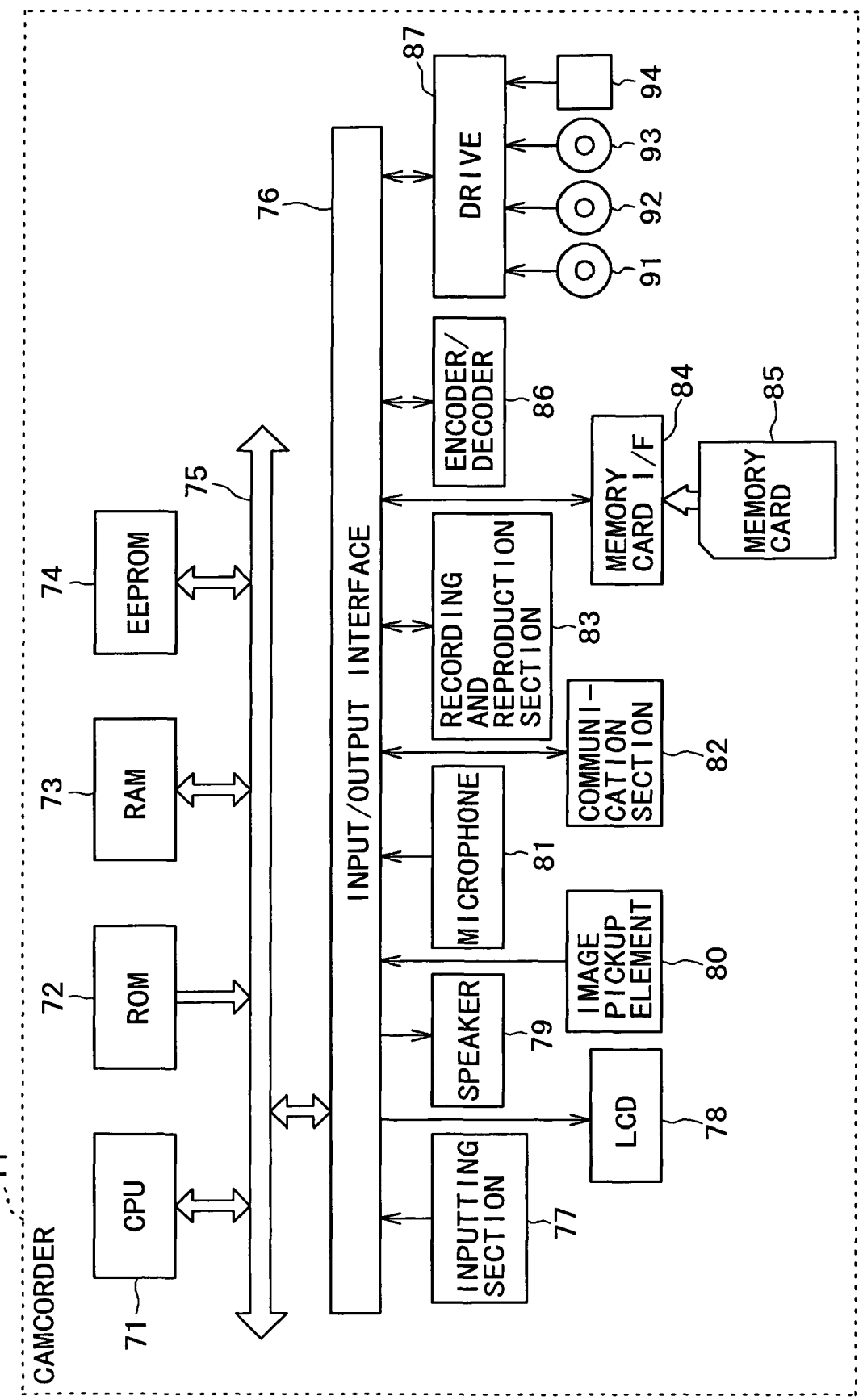

FIG. 12

```
PPP LOGIN:
   □□□@△△△
PPP PASSWORD:
   ○×△□#&★φ
ACCESS POINT TELEPHONE NUMBER:
   **-$$$$-¥¥¥¥
POP ID:
   □□□
POP PASSWORD:
   ○×△□#&★φ
E-MAIL ADDRESS:
   □□□@△△△.xxxx.ne.jp
POP SERVER:
   pop.△△△.xxxx.ne.jp
SMTP MAIL SERVER:
   mail.△△△.xxxx.ne.jp
NEWS SERVER:
   news01.xxxxx.ne.jp
```

FIG. 13

```
DI CUSTOMER ID:
   **000000
DI PASSWORD:
   ######
ACCESS POINT TELEPHONE NUMBER:
   **-$$$$-¥¥¥¥
```

FIG. 14A

| GENERAL ISP SETTING ITEMS |
|---|
| ·PPP CONNECTION ID<br>·PPP CONNECTION PASSWORD<br>·ACCESS POINT TELEPHONE NUMBER<br>·Primary DNS Server<br>·Secondary DNS Server<br>·Proxy Server<br>·Port Number<br>·POP AUTHENTICATION ID<br>·POP AUTHENTICATION PASSWORD<br>·POP Server<br>·SMTP Server<br>·MAIL ADDRESS |

FIG. 14B

| SIMPLE CONNECTION SETTING ITEMS |
|---|
| ·Unified ID<br>·PASSWORD<br>·ACCESS POINT TELEPHONE NUMBER |

F I G. 2 0
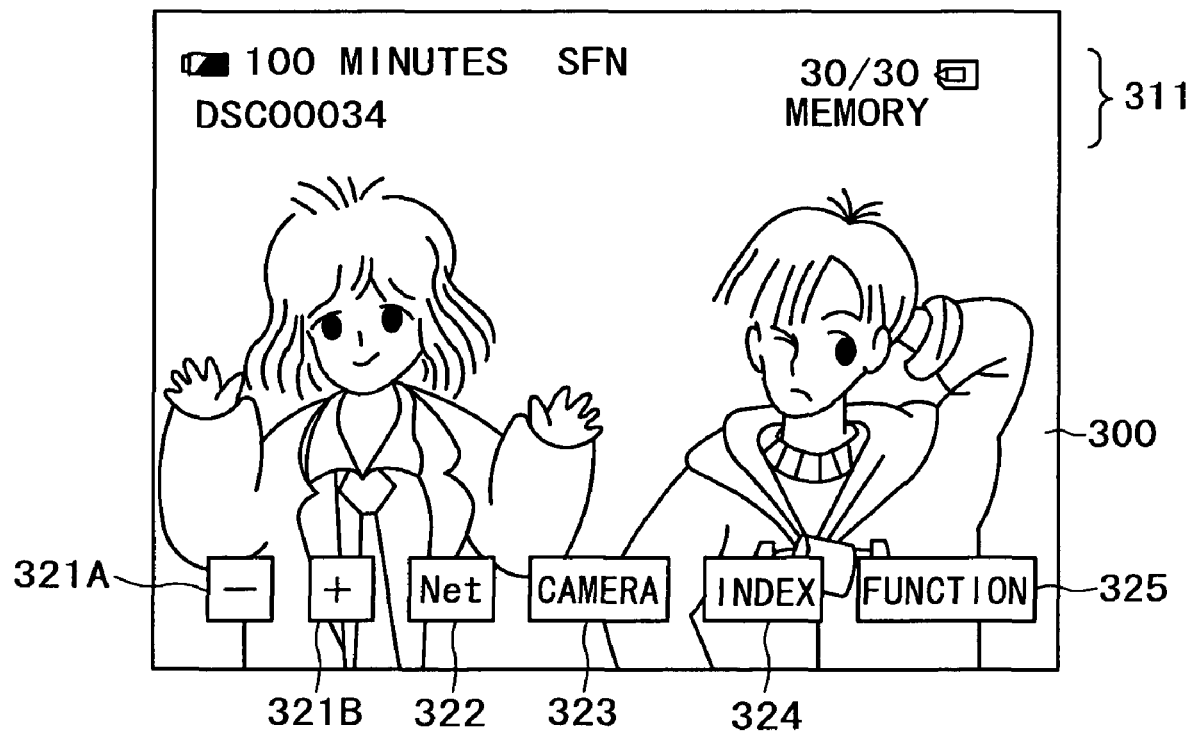

F I G. 2 1
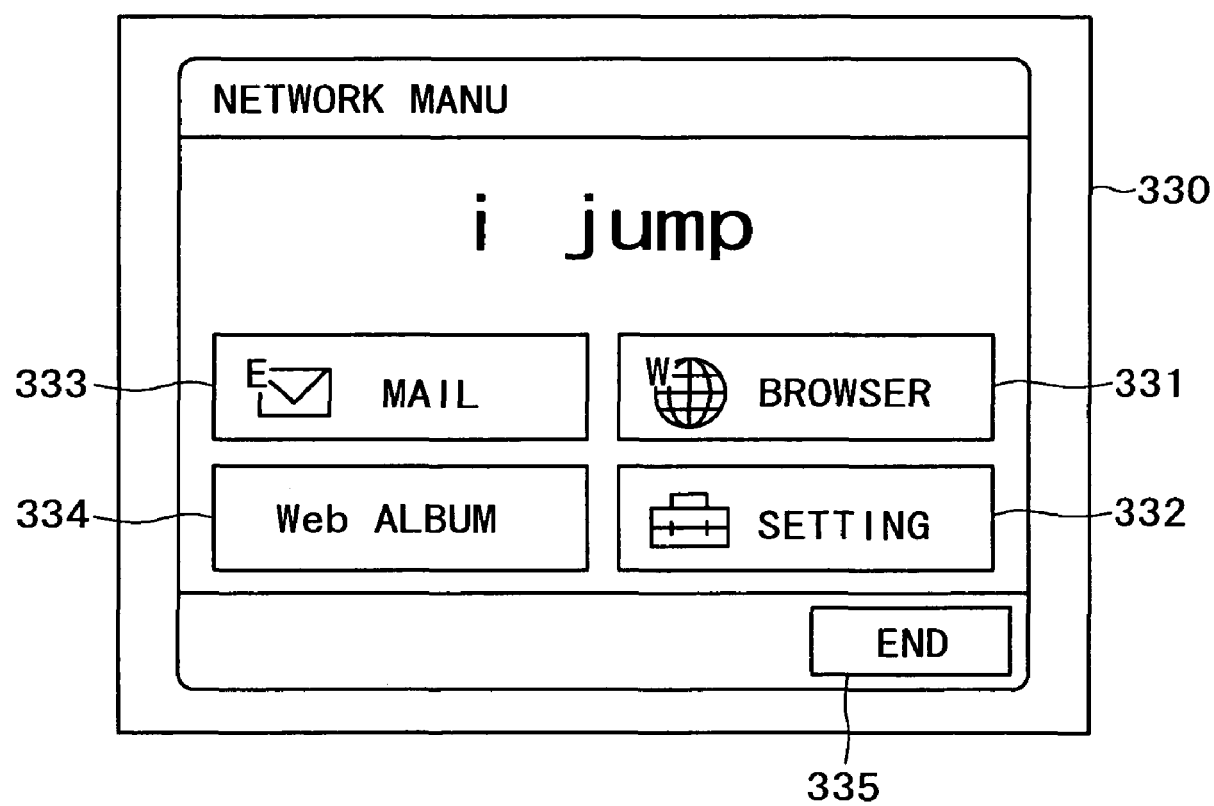

F I G. 3 0
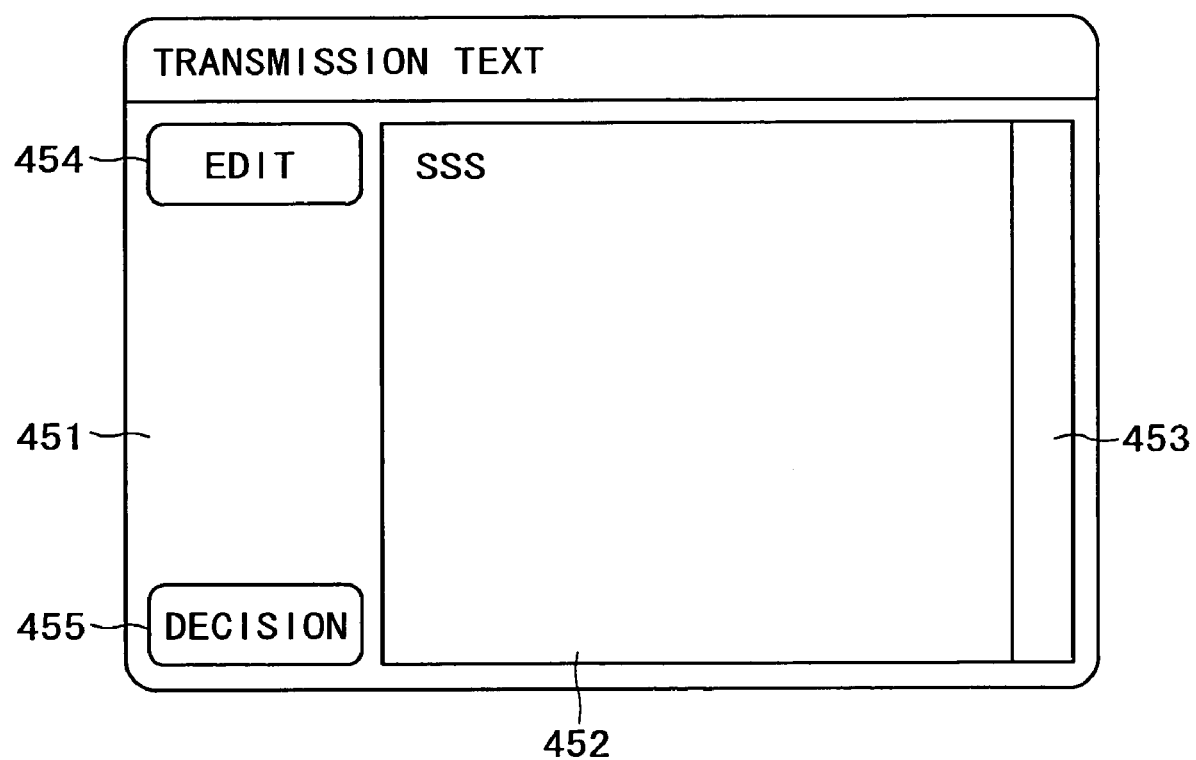

F I G. 3 1
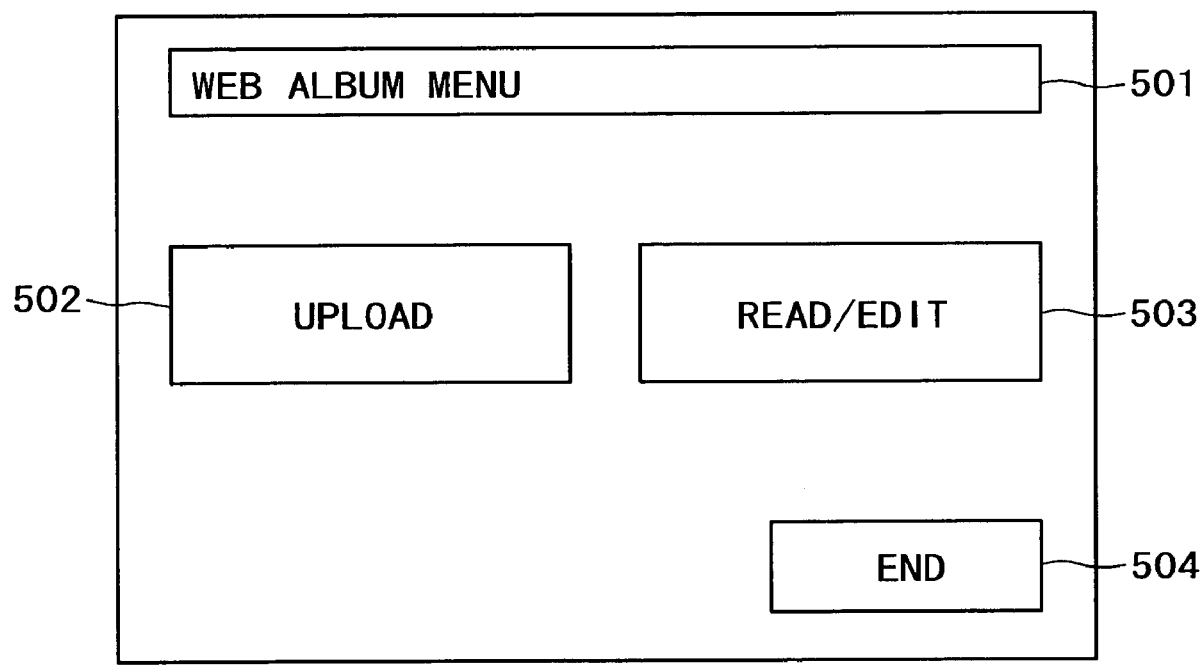

INFORMATION PROCESSING APPARATUS AND METHOD

TECHNICAL FIELD

This invention relates to an information processing apparatus and method, and more particularly to an information processing apparatus and method which allow a user to attach image data of a plurality of images readily to an electronic mail or information regarding uploading of image data.

BACKGROUND ART

FIG. 1 shows an example of a configuration of a network system composed of conventional information processing apparatus. In the network system shown, a personal computer 1 is connected to a server 2-1 or 2-2 or an Internet service provider (ISP) 2-3. The personal computer 1 accesses, in response to an instruction of a user thereof, the server 2-1 or 2-2 or the Internet service provider 2-3, establishes a connection further from it to the Internet and transmits a prepared electronic mail or uploads image data.

Usually, when image data are to be attached to a prepared electronic mail, the user will operate a GUI to designate a file name of data to be attached. Then, the designated data are processed and attached to and transmitted together with the electronic mail.

Such a method as just described, however, has a subject that the user must remember the file name of the image data to be attached, and if the user does not remember the file name, then it must perform such complicated operations as to start up a different application which can read an image and confirm the file name.

Further, also a method wherein a GUI is used to display images of image data in a list so that the user may select image data to be attached from within the list is available. However, such an image list as just described cannot be displayed readily from a GUI screen used for transmitting an electronic mail, and if the user wants to attach an image immediately before an electronic mail is transmitted, complicated operations are required. Further, the number of images of image data which can be selected is one.

This similarly applies also to uploading of data.

DISCLOSURE OF INVENTION

The present invention has been made in view of such a situation as described above, and it is an object of the present invention to make it possible, upon transmission of an electronic mail or upon uploading of image data, for a user to readily select image data of a plurality of images to be attached to the electronic mail or the image data.

According to the present invention, an information processing apparatus is characterized in that it includes transmission means for transmitting information through a network, holding means for holding first GUI information for allowing a user to select image data to be attached to the information to be transmitted by the transmission means, display means for displaying the first GUI information, and input accepting means for accepting an input for operating the first GUI information by the user.

The information transmitted by the transmission means may be an electronic mail or information regarding uploading of the image data.

The first GUI information may include second GUI information for allowing the user to control the transmission of the information by the transmission means, third GUI information for allowing the user to prepare the information and fourth GUI information for allowing the user to select image data to be attached to the information, and the third GUI information or the fourth GUI information may be displayed on the display means in response to an operation of the user based on the second GUI information.

The fourth GUI information may allow selection of image data of a plurality of images as the image data to be attached to the information.

According to the present invention, an information processing method is characterized in that it includes a transmission step of transmitting information through a network, a holding step of holding first GUI information for allowing a user to select image data to be attached to the information to be transmitted by the process at the transmission step, a display step of displaying the first GUI information, and an input accepting step of accepting an input for operating the first GUI information by the user.

According to the present invention, a recording medium is characterized in that a program includes a transmission step of transmitting information through a network, a holding step of holding first GUI information for allowing a user to select image data to be attached to the information to be transmitted by the process at the transmission step, a display step of displaying the first GUI information, and an input accepting step of accepting an input for operating the first GUI information by the user.

According to the present invention, a program causes a computer to execute a transmission step of transmitting information through a network, a holding step of holding first GUI information for allowing a user to select image data to be attached to the information to be transmitted by the process at the transmission step, a display step of displaying the first GUI information, and an input accepting step of accepting an input for operating the first GUI information by the user.

In the information processing apparatus and method, recording medium and program of the present invention, the first GUI information displayed is operated by the user, and selected image data of a plurality of images are attached to information to be transmitted through the network.

BRIEF DESCRIPTION OF DRAWINGS

FIG. 2 is a view showing a configuration of a service providing system to which the present invention is applied;

FIG. 3 is a block diagram showing a configuration of a camcorder of FIG. 2;

FIG. 12 is a view illustrating an example of ISP-A setting information at step S79 of FIG. 11;

FIG. 13 is a view illustrating an example of setting information for the camcorder at step S80 of FIG. 11;

FIG. 14A is a view illustrating setting items upon connection to the Internet;

FIG. 14B is a view illustrating setting items upon connection to the Internet;

FIG. 20 is a view showing an example of a monitor image displayed on an LCD unit 78;

FIG. 21 is a view showing an example of a network menu screen displayed on the LCD unit 78;

FIG. 30 is a view showing an example of a display of a text detail screen displayed on the LCD unit 78;

FIG. 31 is a view showing an example of a display of a WEB album menu screen displayed on the LCD unit 78;

BEST MODE FOR CARRYING OUT THE INVENTION

Figure 1:
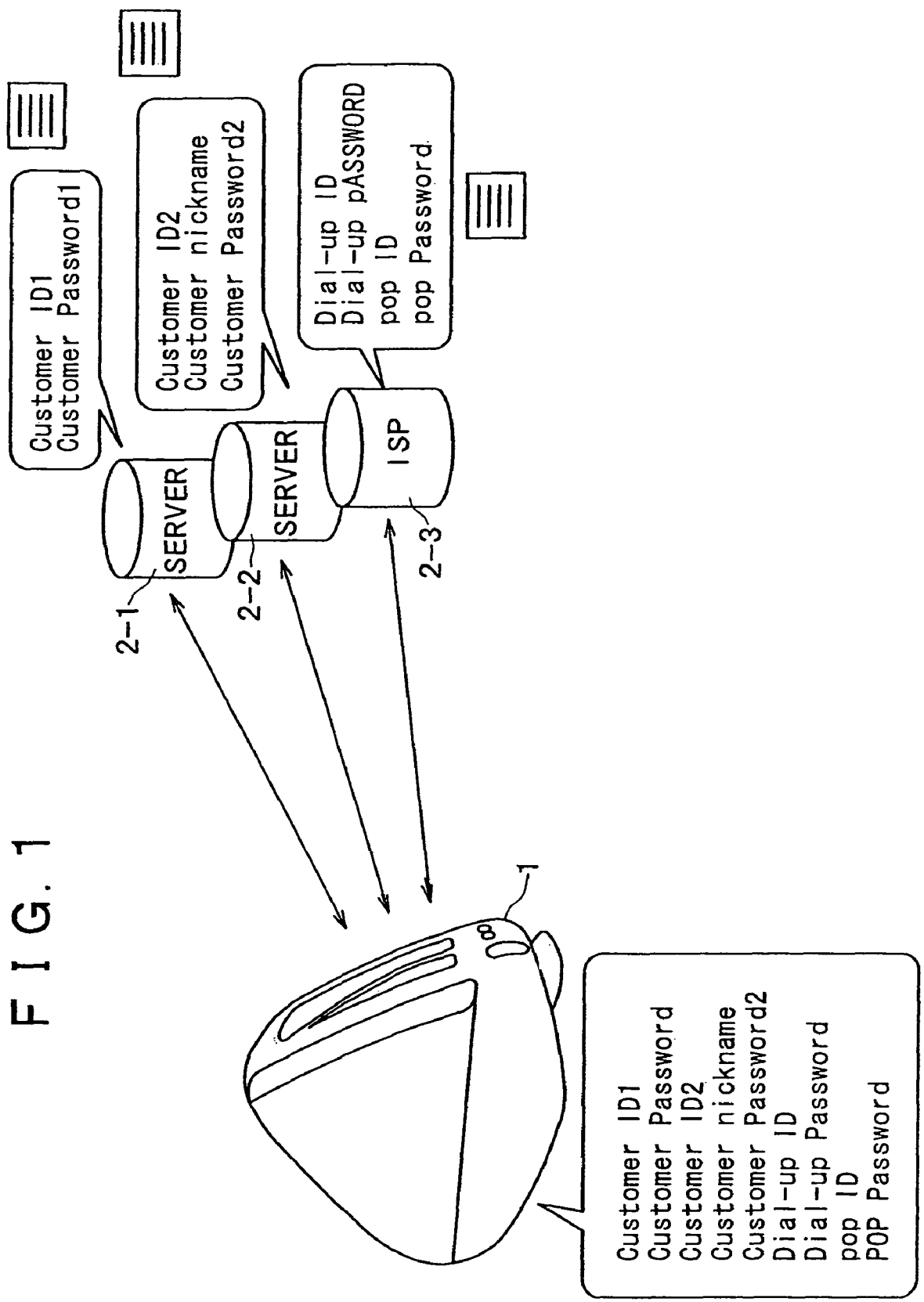
FIG. 1 is a view showing a configuration of a conventional network system.

FIG. 2 shows an example of a configuration of a service providing system including an information processing apparatus to which the present invention is applied. In the service providing system, a network system 14, a network service business center 15, an image station server 16, an Internet service provider A (ISP-A) 17, another Internet service provider B (ISP-B) 18, an information providing server 19, and a search server 20 are connected to the Internet 10.

Further, the network system 14, Internet service provider A17 and Internet service provider B18 are connected to a public network 13. Also the Bluetooth adapter 12 is further connected to the public network 13. A camcorder 11 can be connected to the Bluetooth adapter 12 through short distance radio communication in accordance with the Bluetooth (trademark) and further connected to the network system 14, the Internet service provider A17, or the Internet service provider B18 through the public network 13.

The network system 14 includes an access point (AP) 31, a customer database (C-DB) 32, a customer registration web server 33 and a registration authentication (RAP) 34.

The access point 31 is connected to the public network 13. The customer database 32 records several kinds of information of a user who has purchased the camcorder 11. The customer registration web server 33 controls a registration process of the camcorder 11. The registration authentication platform 34 executes an authentication process of the user in the network system 14.

While, in the example of FIG. 2, the access point 31, customer database 32, customer registration web server 33 and registration authentication platform 34 are formed individually, otherwise they can be formed integrally.

The network service business center 15 has an image station 41 for a camcorder. The camcorder image station 41 registers and manages image data transmitted from the camcorder 11.

The image station server 17 registers and manages image data transmitted from a personal computer not shown.

The Internet service provider A17 includes an access point 51, a customer database 52 and a mail server 53. The mail server 53 includes a POP server 54, and an SMTP (Simple Mail Transfer Protocol) server 55.

The Internet service provider A17 is a particular Internet service provider and is an Internet connection service provided by a party same as a provider of the service providing system shown in FIG. 2 or an enterprise or the like cooperating with the provider.

The access point 51 performs a communication process with the public network 13. The customer database 52 registers various kinds of information of the user of the Internet service provider A17. The POP server 54 principally manages a process of transmission and reception of a mail to and from the camcorder 11. The SMTP server 55 principally manages transmission and reception of a mail to and from another SMTP server (in the case of the present example, an SMTP server 65 of the Internet service provider B18).

The Internet service provider B18 includes an access point 61 and a customer database 62, and further includes a mail server 63 which in turn includes a POP server 64 and the SMTP server 65. This basic configuration is similar to that of the Internet service provider A17.

The information providing server 19 provides various kinds of information regarding, for example, commodities of a predetermined enterprise. The search server 20 provides a service of searching for various kinds of information laid open on the Internet 10.

FIG. 3 shows an example of a configuration of the camcorder 11. The camcorder 11 is a video tape recorder of the type integrated with a camera and has an accessing function to the Internet 10. Referring to FIG. 3, a CPU (Central Processing Unit) 71 executes various processes in accordance with programs stored in a ROM (Read Only Memory) 72 or programs loaded in a RAM (Random Access Memory) 73. Also data necessary for execution of various processes by the CPU 71 and so forth are stored suitably into the RAM 73. Data necessary to be kept stored also after the power supply is disconnected are stored into an EEPROM (Electrically Erasable Programmable Read Only Memory) 74.

The CPU 71, ROM 72, RAM 73 and EEPROM 74 are connected to each other by a bus 75. Also an input/output interface 76 is connected to the bus 75.

Further connected to the input/output interface 76 are an inputting section 77 including various buttons such as a cross key, a determination button, a menu button, switches and so forth, an LCD (Liquid Crystal Display) unit 78, a speaker 79, an image pickup element 80 formed from a CCD (Charge Coupled Device) image pickup element or the like, a microphone 81 for fetching a sound signal, and a communication section 82 which performs short distance radio communication with the Bluetooth adapter 12 in accordance with the Bluetooth.

A recording and reproduction section 83 records image data picked up by the image pickup element 80, sound data gathered by the microphone 81 and so forth onto a cassette magnetic tape loaded therein. Further, the recording and reproduction section 83 reproduces image data and sound data recorded on a cassette magnetic tape, and outputs an image corresponding to the video data to the LCD unit 78 so that the image data are displayed on the LCD unit 78 while it supplies the sound data to the speaker 79 so that the sound data are outputted from the speaker 79.

A memory card interface 84 executes, when a memory card 85 as a portable semiconductor memory is loaded therein, a writing process and a reading out process of data into and from the memory card 85. Into the memory card 85, not only image data picked up by the image pickup element 80 and sound data gathered by the microphone 81 can be recorded, but also various kinds of data acquired from the communication section 82 through the Internet 10 can be stored.

An encoder/decoder 86 encodes or decodes image data in accordance with the MPEG (Moving Picture Experts Group) system or the JPEG (Joint Photographic Coding Experts Group) system.

When necessary, a drive 87 is connected to the input/output interface 76, and a magnetic disk 91, an optical disk 92, a magneto-optical disk 93 or a semiconductor memory 94 is suitably loaded into the input/output interface 76 and a computer program read out from it is installed into the RAM 73 when necessary.

Figure 4:
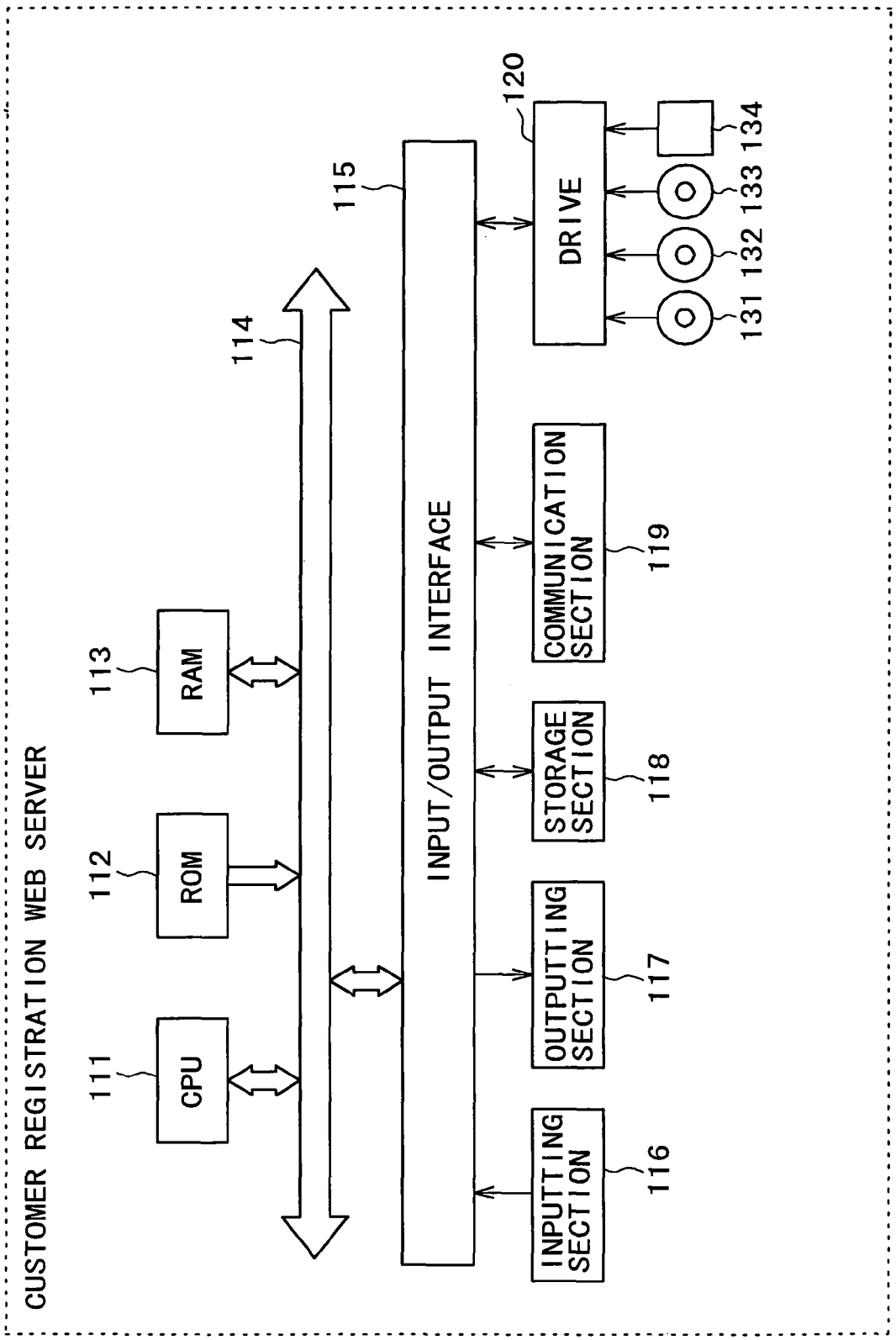
FIG. 4 is a block diagram showing a configuration of a customer registration web server of FIG. 2.

FIG. 4 shows an example of a configuration of the customer registration web server 33. Referring to FIG. 4, a CPU 111 executes various processes in accordance with programs stored in a ROM 112 or programs loaded into a RAM 113 from a storage section 118. Also data necessary for execution of various processes by the CPU 111 and so forth are stored suitably into the RAM 113.

The CPU 111, ROM 112 and RAM 113 are connected to each other by a bus 114. Also an input/output interface 115 is connected to the bus 114.

Further connected to the input/output interface 115 are an inputting section 116 formed from a keyboard, a mouse and so forth, an outputting section 117 formed from a display unit such as a CRT or an LCD unit, a speaker and so forth, a storage section 118 formed from a hard disk or the like, and a communication section 119 formed from a modem, a terminal adapter and so forth. The communication section 119 performs a communication process through a network including the Internet 10.

When necessary, a drive 120 is connected to the input/output interface 115, and a magnetic disk 131, an optical disk 132, a magneto-optical disk 133, a semiconductor memory 134 or the like is suitably loaded into the input/output interface 115 and a computer program read out from it is installed into the storage section 118 when necessary.

Where the access point 31, customer database 32 and registration authentication platform 34 are formed separately from the customer registration web server 33, though not shown, they have a configuration basically similar to that of the customer registration web server 33.

Figure 5:
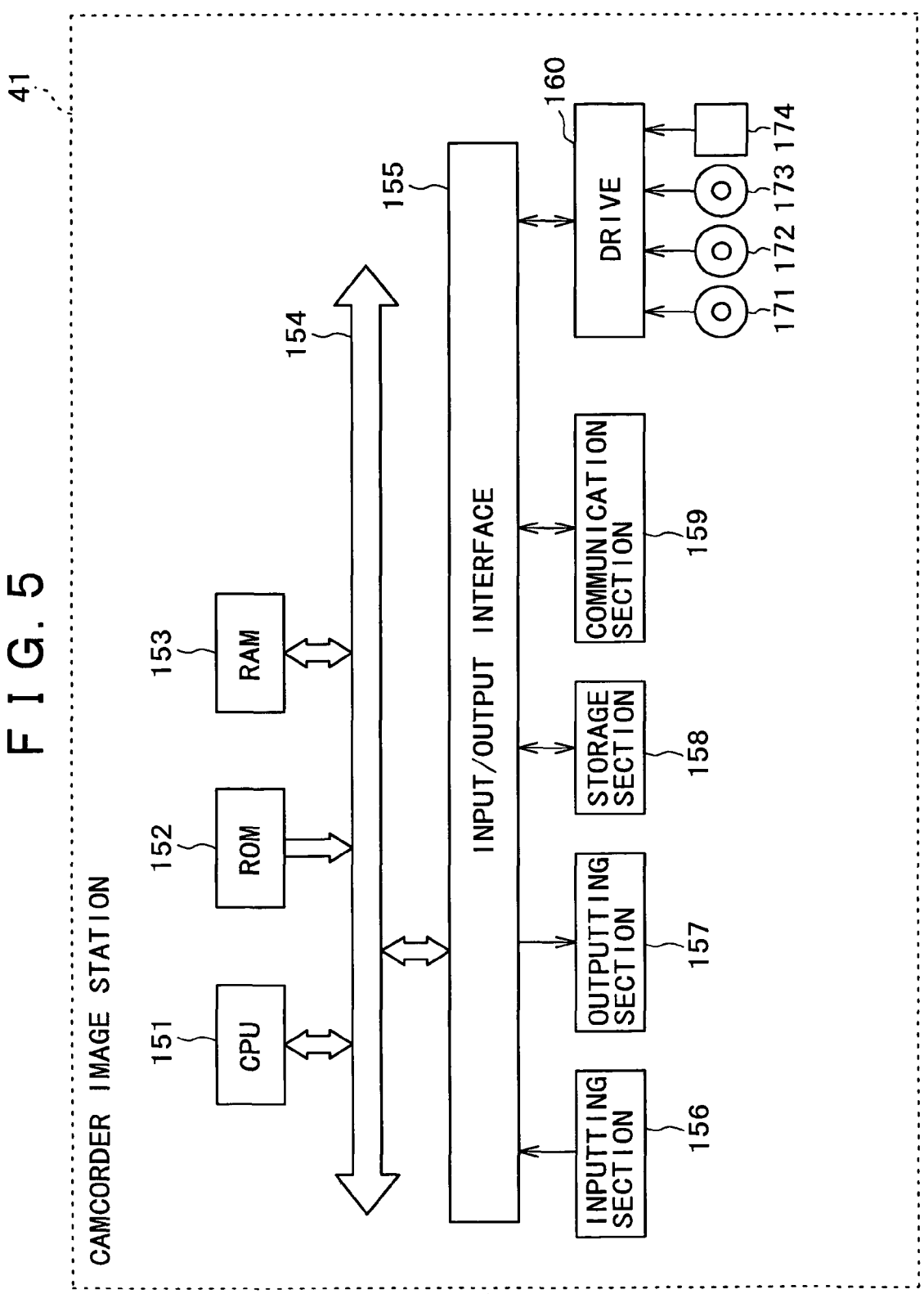
FIG. 5 is a block diagram showing a configuration of an image station for a camcorder of FIG. 2.

FIG. 5 shows an example of a configuration of the camcorder image station 41 which composes the network business center 15. Components of the camcorder image station 41 from a CPU 151 to a semiconductor memory 174 have a configuration basically similar to that of the components of the customer registration web server 33 of FIG. 4 from the CPU 111 to the semiconductor memory 134, and those elements having corresponding names have corresponding functions. Accordingly, description of them is omitted to avoid redundancy.

Figure 6:
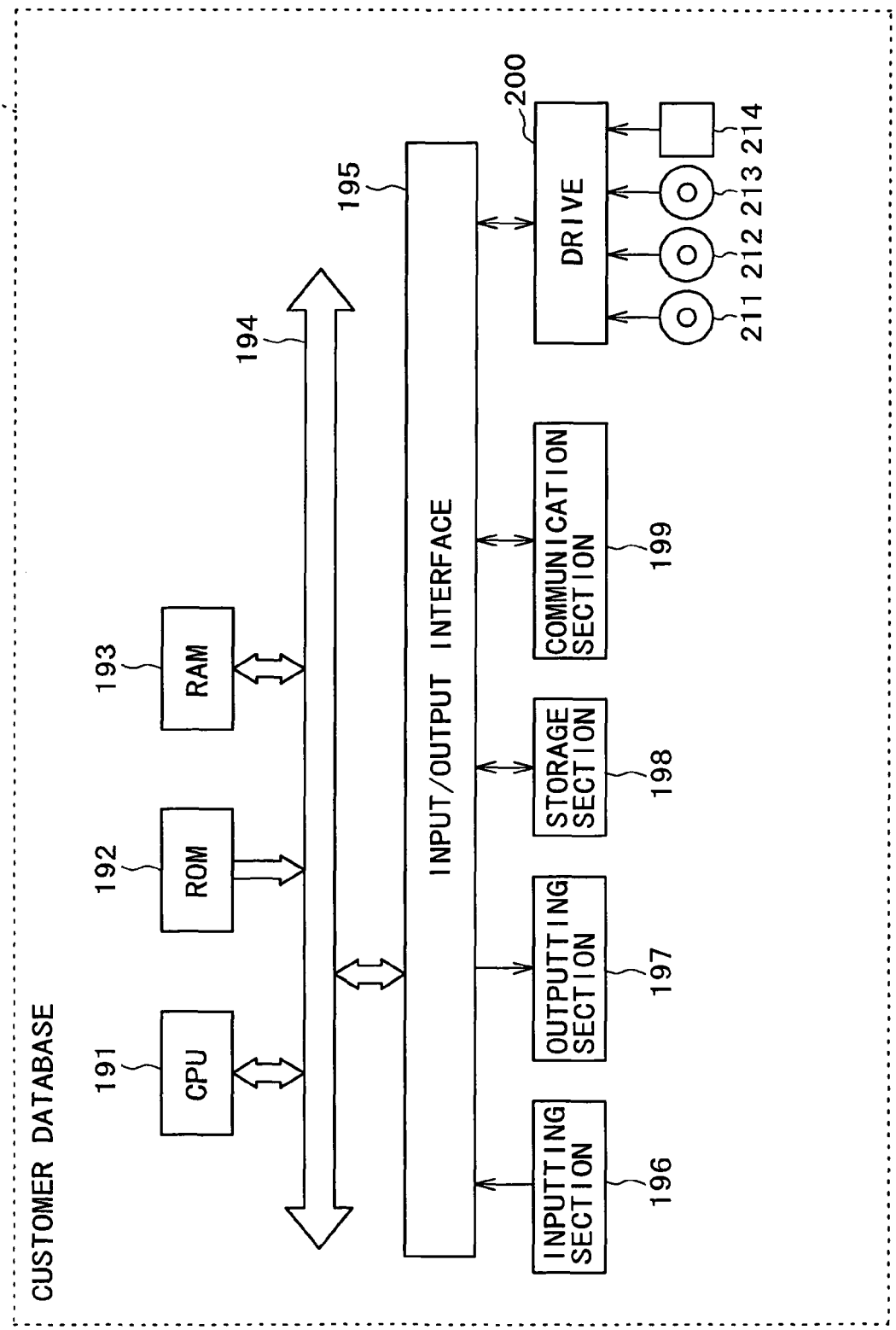
FIG. 6 is a block diagram showing a configuration of a customer database of FIG. 2.

FIG. 6 shows an example of a configuration of the customer database 52 of the Internet service provider A17. Also components of the customer database 52 from a CPU 191 to a semiconductor memory 214 have a configuration basically similar to that of the components of the customer registration web server 33 of FIG. 4 from the CPU 111 to semiconductor memory 134, and those components having corresponding names have corresponding functions. Therefore, overlapping description of them is omitted to avoid redundancy.

Where the access point 51 and the mail server 53 (POP server 54 and SMTP server 55) are formed separately from the customer database 52, also they have a configuration basically similar to that of the customer database 52 of FIG. 6.

A user who has purchased the camcorder 11 can enjoy a service provided by the service providing system of FIG. 2. To this end, the user of the camcorder 11 will execute a process of registering the camcorder 11 (the user thereof) into the network system 14. When the camcorder 11 is purchased, the Bluetooth adapter 12 is annexed as an accessory to the camcorder 11 (if the Bluetooth adapter 12 is not annexed, then it is purchased separately), and the user can connect the Bluetooth adapter 12 to the public network 13 to register the camcorder 11 (the user thereof) into the. network system 14.

Figure 7:
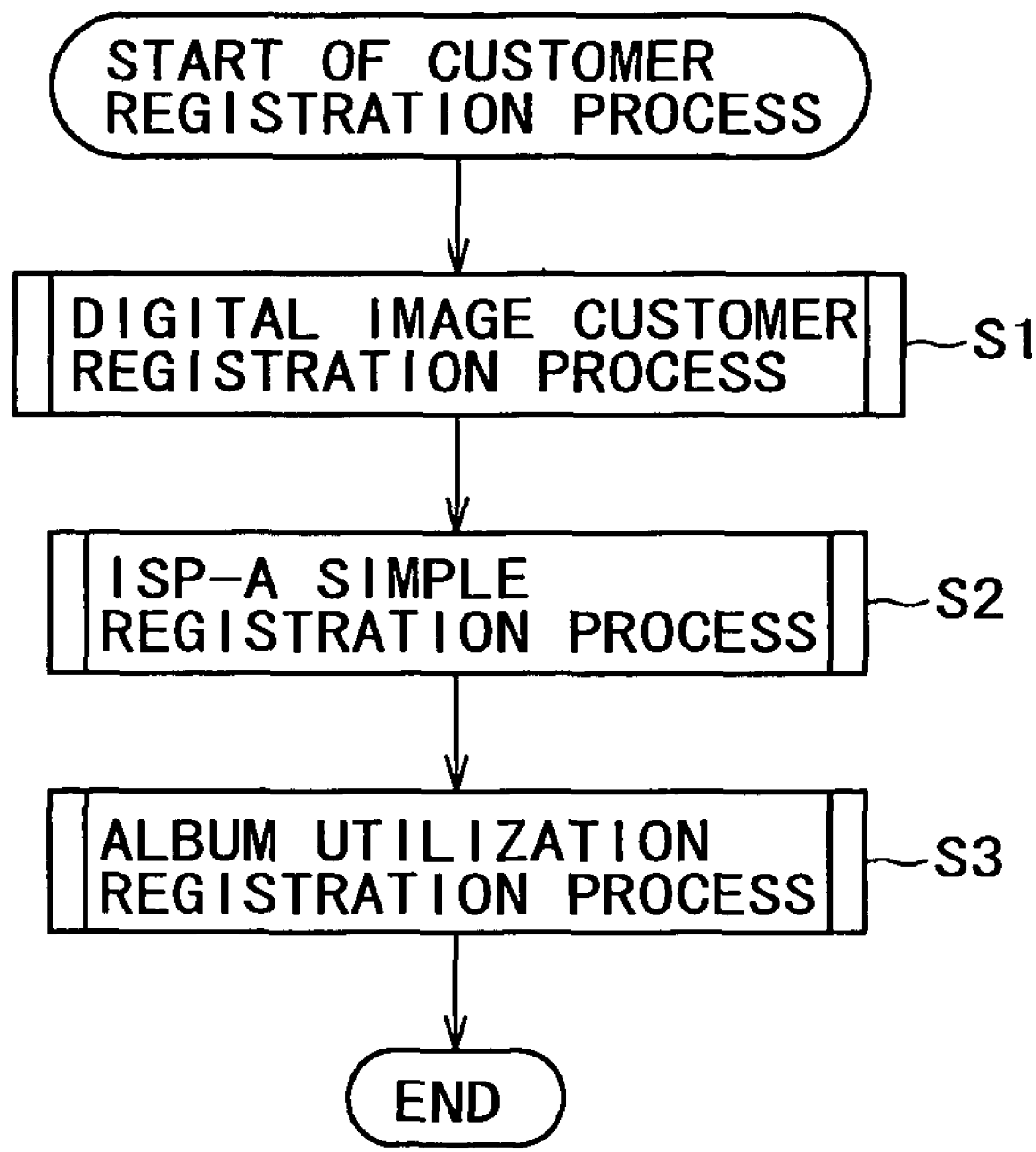
FIG. 7 is a flow chart illustrating a customer registration process in the service providing system of FIG. 2.

When this registration process is performed, a process illustrated in a flow chart of FIG. 7 is executed by the service providing system. In particular, at step S1, a digital image customer registration process is executed by the network system 14, and then at step S2, an ISP-A simple registration process is executed by the Internet service provider A17. Thereafter, at step S3, an album utilization registration process is executed by the network business center 15.

Thus, the processes at steps S1 to S3 are described individually below.

Figure 8:
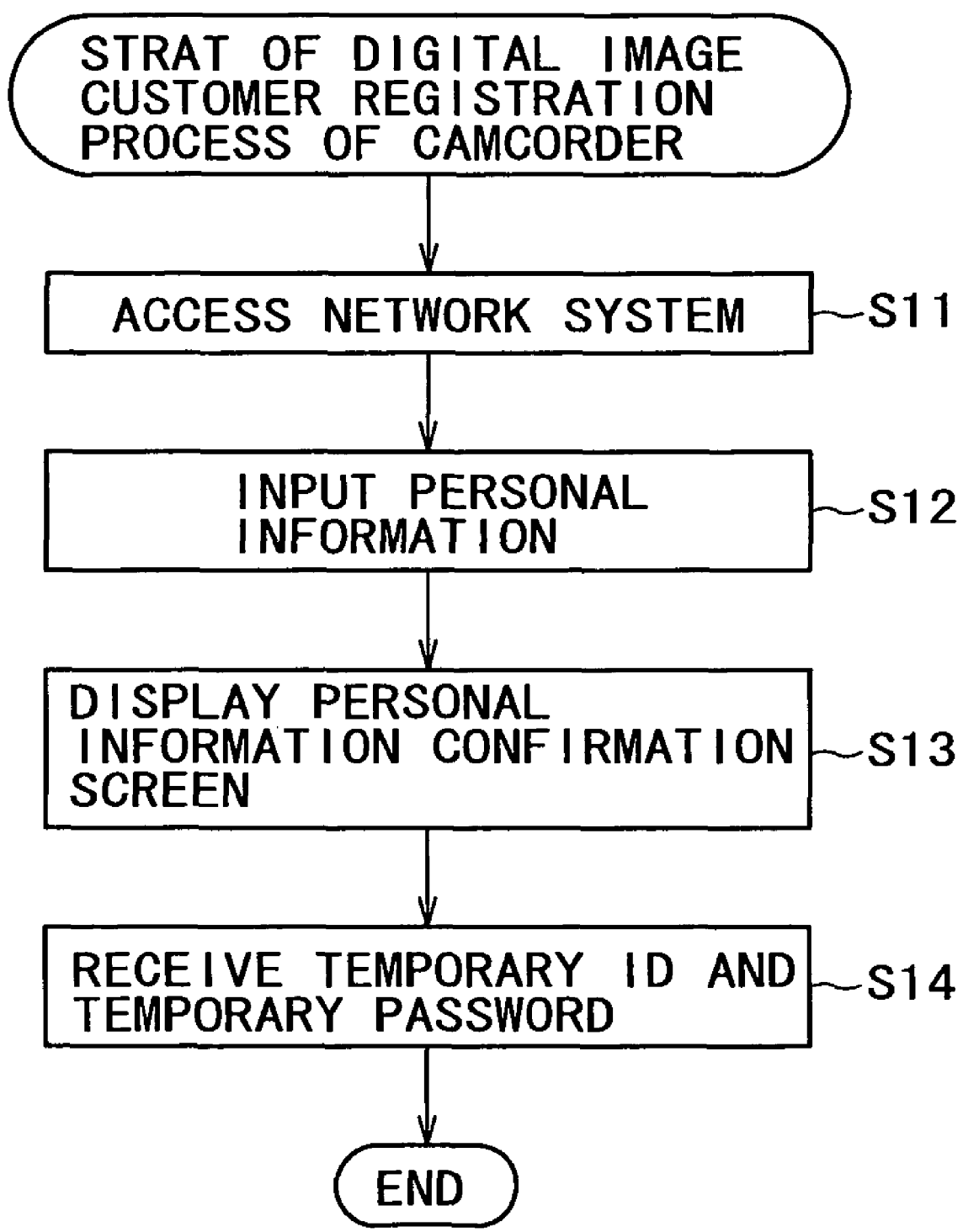
FIG. 8 is a flow chart illustrating a digital image customer registration process of the camcorder of FIG. 2.

First, the digital image customer registration process by the network system 14 is described with reference to flow charts of FIGS. 8 and 9. FIG. 8 illustrates a process of the camcorder 11 when the registration process is performed, and FIG. 9 illustrates a corresponding process of the customer registration web server 33.

At step S11, the user of the camcorder 11 will operate the inputting section 77 to issue an instruction to access the network system 14. The destination of the access is stored in advance in the ROM 72. The CPU 71 controls the communication section 82 based on the information stored in the ROM 72 to issue an instruction to access the access point 31 of the network system 14. Upon reception of the instruction, the communication section 81 communicates with the Bluetooth adapter 12 through short distance communication to access the access point 31 of the network system 14 from the Bluetooth adapter 12 through the public network 13.

A guest ID is utilized for this first time access to the network system 14. In particular, if the user inputs, for example, "GUEST" as an ID, then the registration authentication platform 34 permits the access. After registration authentication platform 34 permits the access from the camcorder 11, it passes the management right for processing for the camcorder 11 to the customer registration web server 33.

Figure 9:
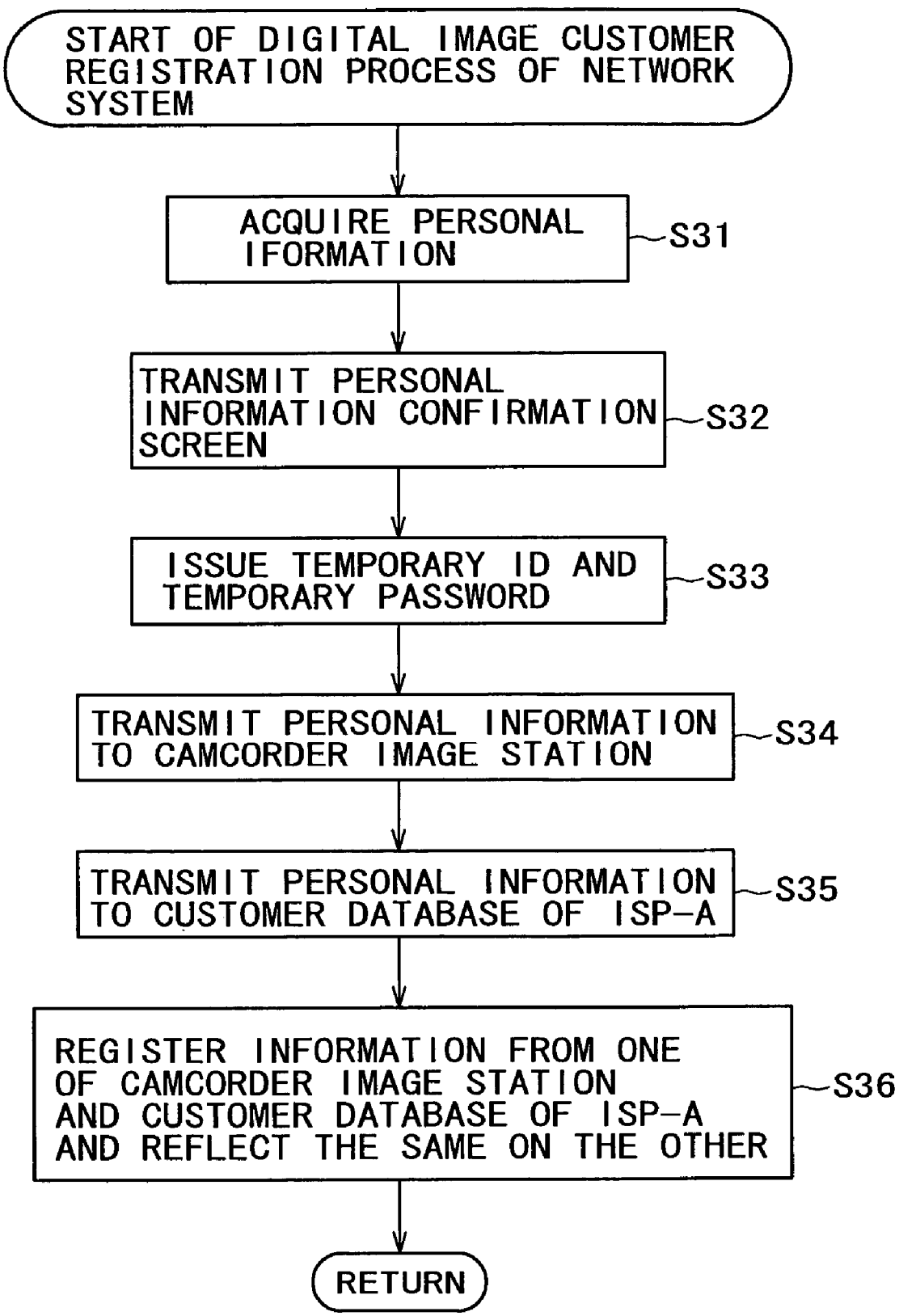
FIG. 9 is a flow chart illustrating a digital image customer registration process of a network system of FIG. 2.

The CPU 111 of the customer registration web server 33 issues, at this time at step S31 of FIG. 9, a request to input personal information to the user of the camcorder 11. This request is outputted from the communication section 119 and transmitted to the camcorder 11 through the access point 31, public network 13 and Bluetooth adapter 12.

Upon reception of the request from the communication section 82, the CPU 71 of the camcorder 11 outputs a message corresponding to the request to the LCD unit 78 so that the message is displayed on the LCD unit 78 at step S12.

The user of the camcorder 11 will operate the inputting section 77 based on the message to input its personal information. The personal information includes a registration code formed from 16 numerical and alphabetical letters of the camcorder 11 (the registration code is carried on a post card annexed to the camcorder 11 when it is purchased), a zip code, the name, an address, the date of birth, the sex, a telephone number, an electronic mail address and so forth of the user, a product number (serial number) and the purchased date of the camcorder 11, and so forth.

When such personal information is inputted, the CPU 71 of the camcorder 11 causes the personal information to be transmitted to the network system 14 at step S12.

In particular, the CPU 71 controls the communication section 82 to transmit the inputted personal information to the network system 14. The personal information is supplied to the customer registration web server 33 through the Bluetooth adapter 12, public network 13 and access point 31.

The CPU 111 of the customer registration web server 33 acquires the personal information through the communication section 119 and supplies the personal information to the RAM 113 so that the personal information is temporarily stored into the RAM 113 at step S31 of FIG. 9.

After the personal information is registered into the RAM 113, the CPU 111 produces a personal information confirmation screen and causes the personal information confirmation screen to be transmitted from the communication section 119 to the camcorder 11 at step S32. The data of the personal information confirmation screen are supplied from the access point 31 to the Bluetooth adapter 12 through the public network 13 and then transmitted from the Bluetooth adapter 12 to the camcorder 11.

The CPU 71 of the camcorder 11 receives the data of the personal information confirmation screen through the communication section 82 and stores the data once into the RAM 73 and then reads out and outputs the data to the LCD unit 78 so that the personal information confirmation screen is displayed on the LCD unit 78 at step S13 of FIG. 8. Consequently, the personal information inputted by the user of the camcorder 11 is displayed on the LCD unit 78 for confirmation by the user.

If the user operates the inputting section 77 to input that the personal information inputted by the user itself has been affirmed, then the CPU 71 controls the communication section 82 to transmit the confirmation signal to the customer registration web server 33.

The CPU 111 of the customer registration web server 33 receives the confirmation signal through the communication section 119 and transfers the personal information registered in the RAM 113 to the storage section 118 so that the personal information is stored into the storage section 118 at step S32 of FIG. 9.

Then at step S33, the CPU 111 issues a temporary ID and a temporary password to the user of the camcorder 11. The temporary ID and the temporary password are outputted from the communication section 119 and transmitted to the camcorder 11 through the access point 31, public network 13 and Bluetooth adapter 12.

The CPU 71 of the camcorder 11 receives the temporary ID and the temporary password through the communication section 82 and either supplies them to the LCD unit 78 so that they are displayed on the LCD unit 78 or supplies them to the EEPROM 74 so that they are stored into the EEPROM 74 at step S14 of FIG. 8.

The customer registration web server 33 supplies the personal information of the user of the camcorder 11 registered in the storage section 118 in such a manner as described above to the customer database 32 so that the personal information is registered into the customer database 32 at step S33.

At step S34, the customer database 32 supplies the personal information to the camcorder image station 41 of the network service business center 15 through the Internet 10.

The CPU 151 of the camcorder image station 41 receives the personal information transmitted from the network system 14 through the communication section 159 and supplies the personal information to the storage section 158 so that the personal information is stored into the storage section 158 (at step S121 of FIG. 16 hereinafter described).

At step S35, the customer database 32 further transmits the personal information of the camcorder 11 to the customer database 52 of the Internet service provider 7.

The customer database 52 of the Internet service provider A17 registers the personal information of the camcorder 11 transmitted from the network system 14 through the Internet 10 (at step S71 of FIG. 11 hereinafter described).

It is to be noted that, at step S36, when the personal information of the user of the camcorder 11 is changed later in the network business center 15, the customer database 32 of the network system 14 receives this from the camcorder image station 41 through the Internet 10 and stores it into the customer database 32 itself. Further, the customer database 32 supplies the updated personal information from the Internet 10 to the customer database 52 of the Internet service provider A17 so that the changed personal information is registered into the customer database 52.

On the contrary, since, when the user of the camcorder 11 changes the personal information, this is registered into the customer database 52 in the Internet service provider A17, the customer database 52 issues a notification of this to the customer database 32 of the network system 14 through the Internet 10. The customer database 32 overwrites the inputted personal information on the old personal information to update the personal information.

At this time, the customer database 32 further transmits the updated personal information to the camcorder image station 41 of the network business center 15 through the Internet 10.

The camcorder image station 41 updates the old personal information with the inputted personal information.

In this manner, if the personal information in the network system 14, network service business center 15 and Internet service provider A17 is updated in any one of them, then this is reflected immediately on the real time basis on the other two.

After the user of the camcorder. 11 is registered into the customer database 32 of the network system 14 in such a manner as described above, the network system 14 thereafter issues a notification of various kinds of information regarding the camcorder 11 to the user of the camcorder 11 when necessary through the Internet 10 or by such means as a post card.

After the digital image customer registration process is completed in such a manner as described above, the ISP-A simple registration process is executed subsequently. In particular, when the customer registration process is completed, the customer registration web server 33 passes the management right for later processing for the camcorder 11 to the customer database 52 of the Internet service provider A17.

Figure 10:
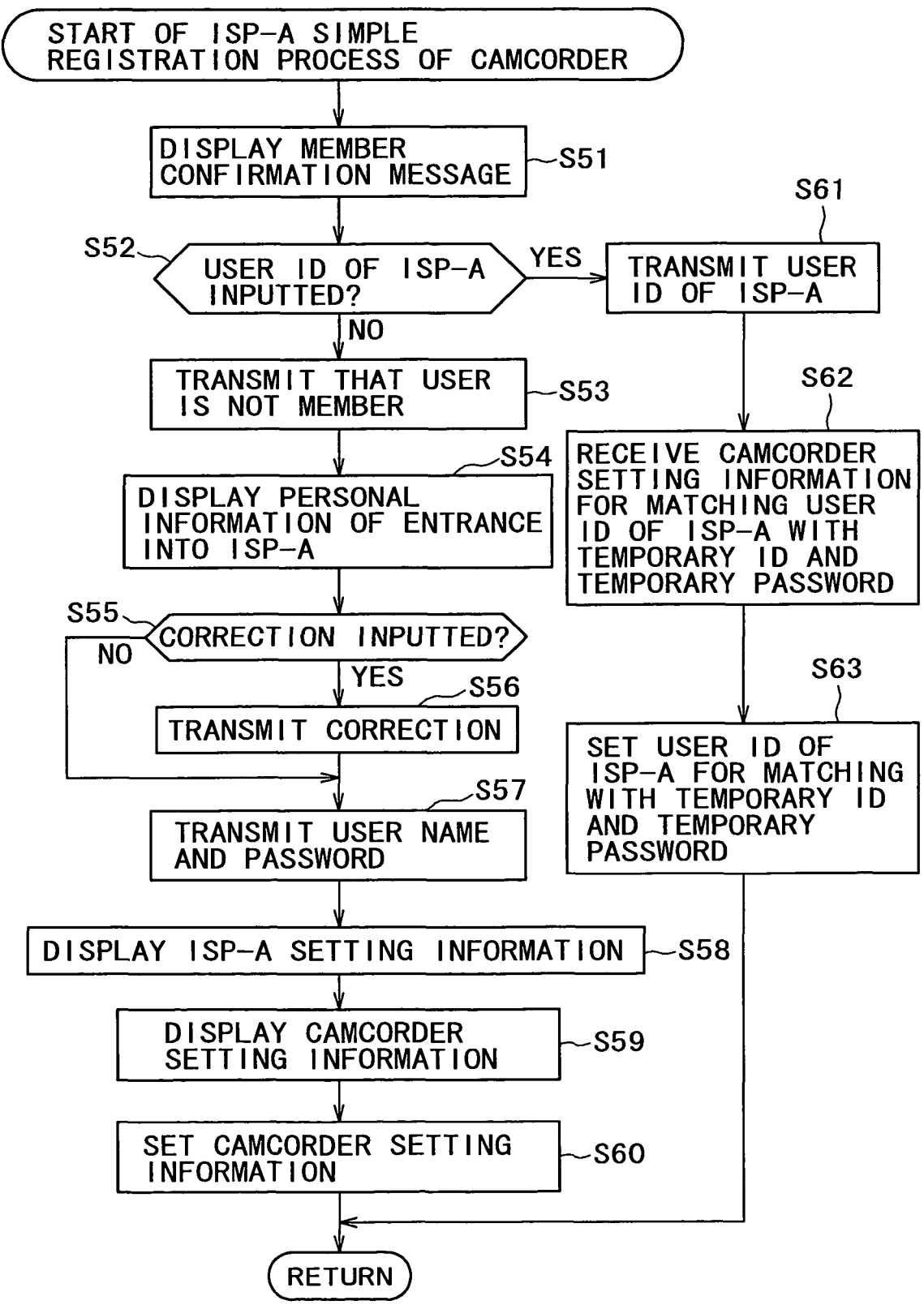
FIG. 10 is a flow chart illustrating an ISP-A simple registration process of the camcorder of FIG. 2.

Accordingly, the ISP-A simple registration process is thereafter executed between the camcorder 11 and the customer database 52 of the Internet service provider A17. FIG. 10 illustrates a process of the camcorder 11 in this instance, and FIG. 11 illustrates a corresponding process of the customer database 52.

Figure 11:
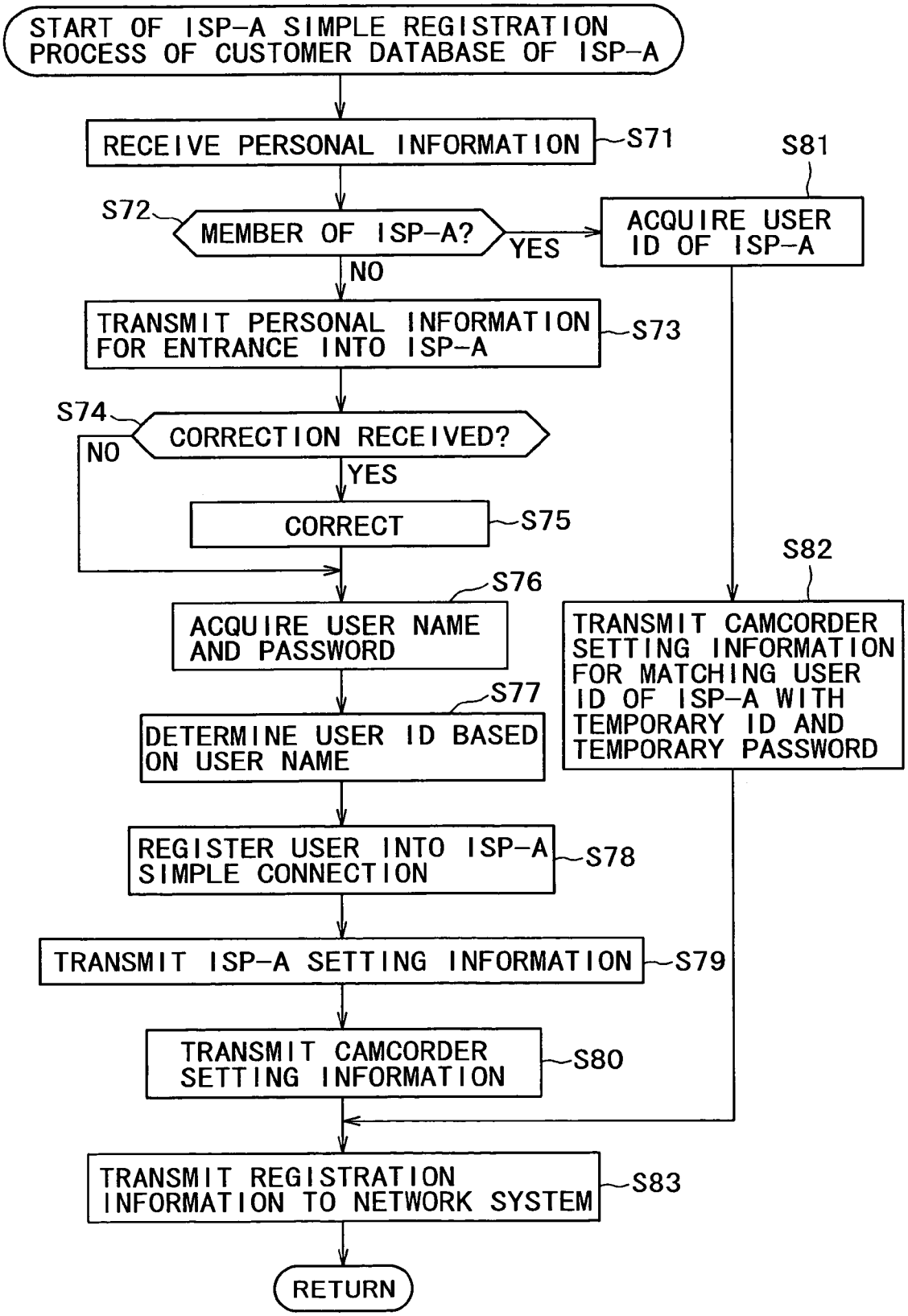
FIG. 11 is a flow chart illustrating an ISP-A simple registration process of the customer database of an Internet service provider A of FIG. 2.

After the CPU 191 of the customer database 52 of the Internet service provider A17 receives the personal information transmitted from the customer database 32 of the network system 14 at step S35 of FIG. 9, it supplies the personal information to the storage section 198 so that the personal information is stored into the storage section 198 at step S71 of FIG. 11.

When the personal information of the camcorder 11 is received at step S71, the customer database 52 of the Internet service provider A17 issues a request to the camcorder 11 to input whether or not the user already is a member of the Internet service provider A17 and input, if the user is a member, the user ID of the Internet service provider A17.

The CPU 71 of the camcorder 11 receives the request and outputs a corresponding message to the LCD unit 78 so that the message is displayed on the LCD unit 78 at step S51 of FIG. 10. The user will observe the display and operate, if the user itself is a member of the Internet service provider A17 already, the inputting section 77 to input its user ID. On the other hand, if the user is not a member, this will be inputted. The CPU 71 of the camcorder 11 discriminates, at step S52, whether or not the user ID of the Internet service provider A17 is inputted. If it is inputted that the user is not a member of the Internet service provider A17, then the CPU 71 controls the communication section 82 to transmit a notification of this to the customer database 52 of the Internet service provider A17 at step S53.

The CPU 191 of the customer database 52 receives this input through the communication section 199 and discriminates that the user is not a member of the Internet service provider A17 at step S72 of FIG. 11. Thereafter, the processing advances to step S73, at which the CPU 191 causes personal information for entry into the Internet service provider A17 to be transmitted. As this personal information, the information transmitted from the network system 14 by the process at step S35 of FIG. 9 and received and stored at step S71 is used basically as it is.

The CPU 71 of the camcorder 11 receives the personal information for entry into the Internet service provider A17 through the communication section 82 and outputs the personal information to the LCD unit 78 so that the personal information is displayed on the LCD unit 78 at step S54 of FIG. 10.

This personal information is basically free from an error because it was inputted by the user of the camcorder 11 when it performed its user registration into the network system 14. However, to make sure, the user will observe the display and discriminate whether or not the personal information need to be corrected. If the personal information need be corrected, then the user will operate the inputting section 77 to input correction.

Thus, at step S55, the CPU 71 of the camcorder 11 discriminates whether or not correction is inputted. If correction is inputted, then the CPU 71 controls the communication section 82 to transmit the corrected item to the customer database 52 of the Internet service provider A17 at step S56. If correction is not inputted, then the process at step S56 is skipped.

The CPU 191 of the customer database 52 of the Internet service provider A17 discriminates at step S74 of FIG. 11 whether or not correction is received through the communication section 199. If correction is received, then the CPU 191 corrects the registered personal information based on the received contents of the correction at step S75. If correction is not received, then the process at step S75 is skipped.

As the personal information, the personal information when the user who purchased the camcorder 11 performed its user registration into the network system 14 is displayed basically as it is as described hereinabove (from within the personal information, only that information which is necessary for the user to become a member of the Internet service provider A17 is displayed). Accordingly, the user need not input items basically similar to the items which were inputted for user registration into the network system 14 again in order to become a member of the Internet service provider 7. Accordingly, the operability is improved.

Then at step S57, the CPU 71 of the camcorder 11 controls the LCD unit 78 to display a message for urging the user to input a user name and a password in accordance with an input guidance from the customer database 52. The user of the camcorder 11 will operate the inputting section 77 in accordance with the message to input the user name and the password which the user uses when it utilizes the Internet service provider A17. The CPU 71 controls the communication section 82 to transmit the user name and the password thus inputted to the customer database 52 of the Internet service provider A17.

The CPU 191 of the customer database 52 receives, at step S76, the user name and the password through the communication section 199 and discriminates based on the data stored in the storage section 198 whether or not the user name and the password are already used by some other user. If they are used, then a message representing this is transmitted from the communication section 199 to the camcorder 11.

The CPU 71 of the camcorder 11 receives the message through the communication section 82 and controls the LCD unit 78 to display the message. The user of the camcorder 11 will observe the display, and if it discriminates that the user name and the password inputted are. registered already, then it will input a new user name and a new password.

When the user name and the password are transmitted from the camcorder 11 in such a manner as described above, the CPU 191 of the customer database 52 acquires them through the communication section 199 at step S76 of FIG. 11 and determines a user ID based on the user name at step S77. This user ID is a user ID as a member of the Internet service provider A17.

In the present service providing system, a common ID and a common password can be used in the network system 14, network service business center 15 and Internet service provider A17. However, as described hereinabove, at the stage wherein user registration is performed into the network system 14, a temporary ID and a temporary password are already set to the user of the camcorder 11 (at step S14 of FIG. 8, and at step S33 of FIG. 9).

In order to allow the user to enjoy a service provided by the Internet service provider A17 based on the temporary ID and the temporary password, the CPU 191 produces, at step S78, a table which describes a matching relationship for matching the temporary ID and the temporary password issued by the network system 14 at step S33 of FIG. 9 and received by the process at step S71 with the user ID determined at step S77, and registers the table into the ISP-A simple connection.

Consequently, when the user of the camcorder 11 accesses the Internet service provider A17 based on the temporary ID and the temporary password issued from the network system 14 at step S33 of FIG. 9 and received by the camcorder 11 at step S14 of FIG. 8, the customer database 52 searches for the user ID corresponding to the temporary ID and the temporary password from the table to allow the user of the camcorder 11 to utilize a service provided by the Internet service provider A17.

When registration of the user of the camcorder 11 as a member of the Internet service provider A17 is completed in such a manner as described above, the CPU 191 transmits, at step S79, setting information necessary for accessing to the Internet service provider A17 to the camcorder 11.

The CPU 71 of the camcorder 11 receives the ISP-A setting information from the Internet service provider 7 and outputs it to the LCD unit 78 so that the ISP-A setting information is displayed on the LCD unit 78 at step S58 of FIG. 10. Consequently, the user can confirm the ISP-A setting information. The ISP-A setting information describes, for example, as shown in FIG. 12, PPP login, a PPP password, an access point telephone number, a POP ID, a POP password, an E-mail address, a POP server, an SMTP mail server, a news server and so forth.

The user of the camcorder 11 will take a note of the contents shown in FIG. 12 when necessary and operate the inputting section 77 to output a signal of confirmation to the Internet service provider A17.

The customer database 52 of the Internet service provider A17 transmits camcorder setting information at step S80.

The camcorder 11 receives the camcorder setting information and controls the LCD unit 78 to display the camcorder setting information at step S59 of FIG. 10.

FIG. 13 illustrates an example of the camcorder setting information transmitted from the customer database 52 to the camcorder 11 in this manner. In the example illustrated, the camcorder setting information is composed of a DI customer ID, a DI password and an access point telephone number.

The access point telephone number represents a telephone number of a point to be accessed when the camcorder 11 establishes a connection to the Internet 10, more particularly, of the access point 51 of the Internet service provider A17.

The user of the camcorder 11 will operate the inputting section 77 to set the camcorder setting information displayed in this manner as a requirement for connection to the Internet 10 to the camcorder 11. This setting is stored into the EEPROM 74.

For example, in order for the user who has purchased a personal computer to establish a connection to the Internet 10 through a general service provider (in the example of FIG. 2, the Internet service provider B18), it must set such totaling 12 items including an ID for PPP connection, a password for PPP connection, an access point telephone number, a Primary DNS server, a Secondary DNS server, a Proxy Server, a Port Number, an ID for POP authentication, a password for POP authentication, a POP server, an SMTP server and a mail address as shown in FIG. 14A. However, where the user who has purchased the camcorder 11 in this manner performs the ISP-A simple registration process, it is necessary for the user of the camcorder 11 only to set such three items including a Unified ID (which corresponds to the DI customer ID in FIG. 13), a password (which corresponds to the DI password in FIG. 13) and an access point telephone number (which corresponds to the access point telephone number in FIG. 13) as shown in FIG. 14B. Accordingly, even if the user is unfamiliar to such setting operation, it can perform operation for connection to the Internet simply.

Where the user itself of the camcorder 11 is a member of the Internet service provider A17 already, it will operate the inputting section 77 based on the request from the customer database 52 to input the user ID of the Internet service provider A17. Thus, in this instance, the CPU 71 of the camcorder 11 acquires the user ID of the Internet service provider A17 inputted from the user and controls the communication section 82 to transmit the user ID of the Internet service provider 7 to the customer database 52 at step S61 of FIG. 10.

The CPU 191 of the customer database 52 of the Internet service provider A17 receives and acquires the user ID of the Internet service provider A17 transmitted from the camcorder 11 at step S81 of FIG. 11, and causes camcorder setting information for matching the user ID of the Internet service provider A17 of the user with the temporary ID and the temporary password included in the personal information of the user received by the process at step S71 to the camcorder 11 at step S82.

When the CPU 71 of the camcorder 11 receives the camcorder setting information for matching the user ID of the Internet service provider A17 with the temporary ID and the temporary password transmitted from the customer database 52, it performs, based on an input performed by an operation of the inputting section 77 by the user, a process of setting so that the user ID of the Internet service provider A17 matches with temporary ID and the temporary password at step S63. More particularly, the CPU 71 produces a matching table between the user ID of the Internet service provider A17 and the temporary ID and temporary password. Accordingly, if the temporary password and the temporary ID are inputted and an instruction to establish a connection to the Internet 10 is issued, then the CPU 71 converts the temporary ID and the temporary password into the user ID of the Internet service provider A17 and performs an accessing process to the Internet service provider A17.

The CPU 191 of the customer database 52 advances its processing after the process at step S80 or S82 of FIG. 11 to step S83, at which it transmits the information registered by the processing till then or, where the registration information is updated by the user, the updated information, to the network system 14.

The customer database 32 of the network system 14 receives the registration information from the Internet service provider A17 and registers it into the customer database 32 itself. Further, the customer database 32 transmits the registration information to the camcorder image station 41 of the network service business center 15 so that the registration information may be reflected on the camcorder image station 41.

Figure 15:
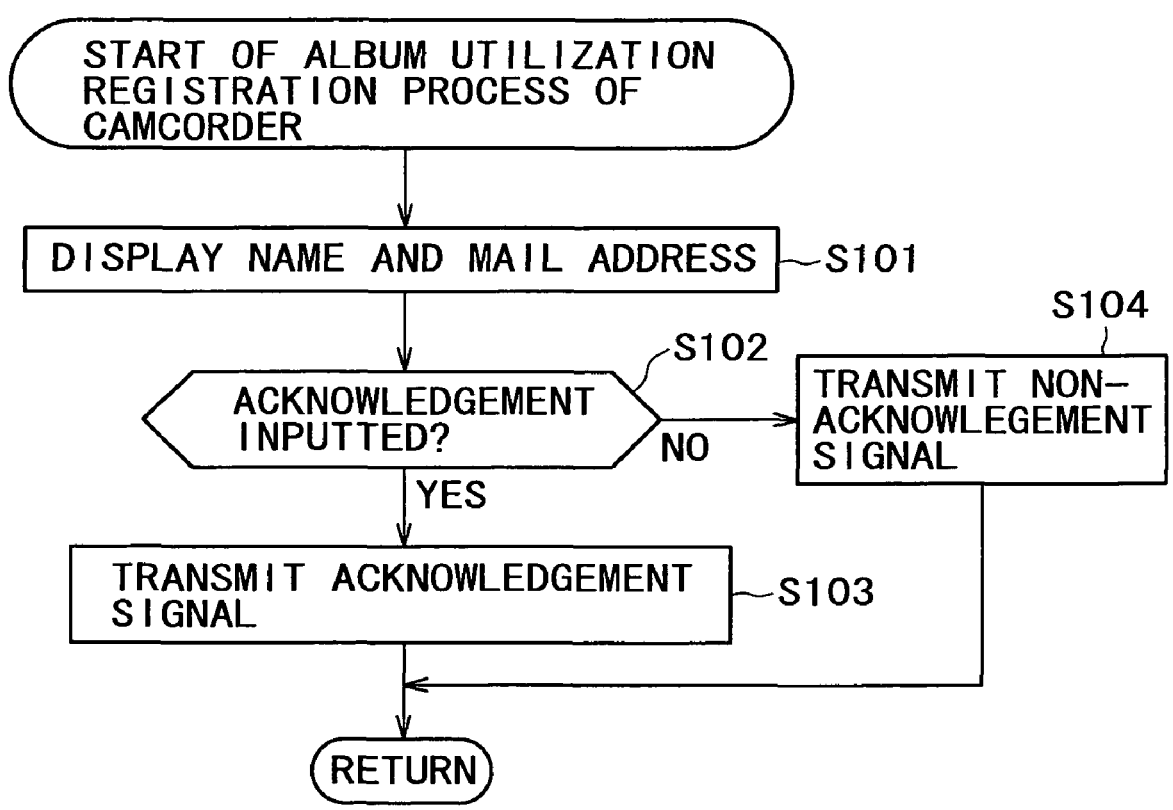
FIG. 15 is a flow chart illustrating an album utilization registration process of the camcorder of FIG. 2.

Subsequently to such an ISP-A simple registration process as described above, the album utilization registration process is executed. The album utilization registration is further described with reference to flow charts of FIGS. 15 and 16. FIG. 15 illustrates an album utilization registration process of the camcorder 11 while FIG. 16 illustrates a corresponding album utilization registration process of the camcorder image station 41.

After the simple registration process of the ISP-A, the CPU 191 of the customer database 52 of the Internet service provider A17 passes the management right for processing of the camcorder 11 to the camcorder image station 41 of the network service business center 15.

Figure 16:
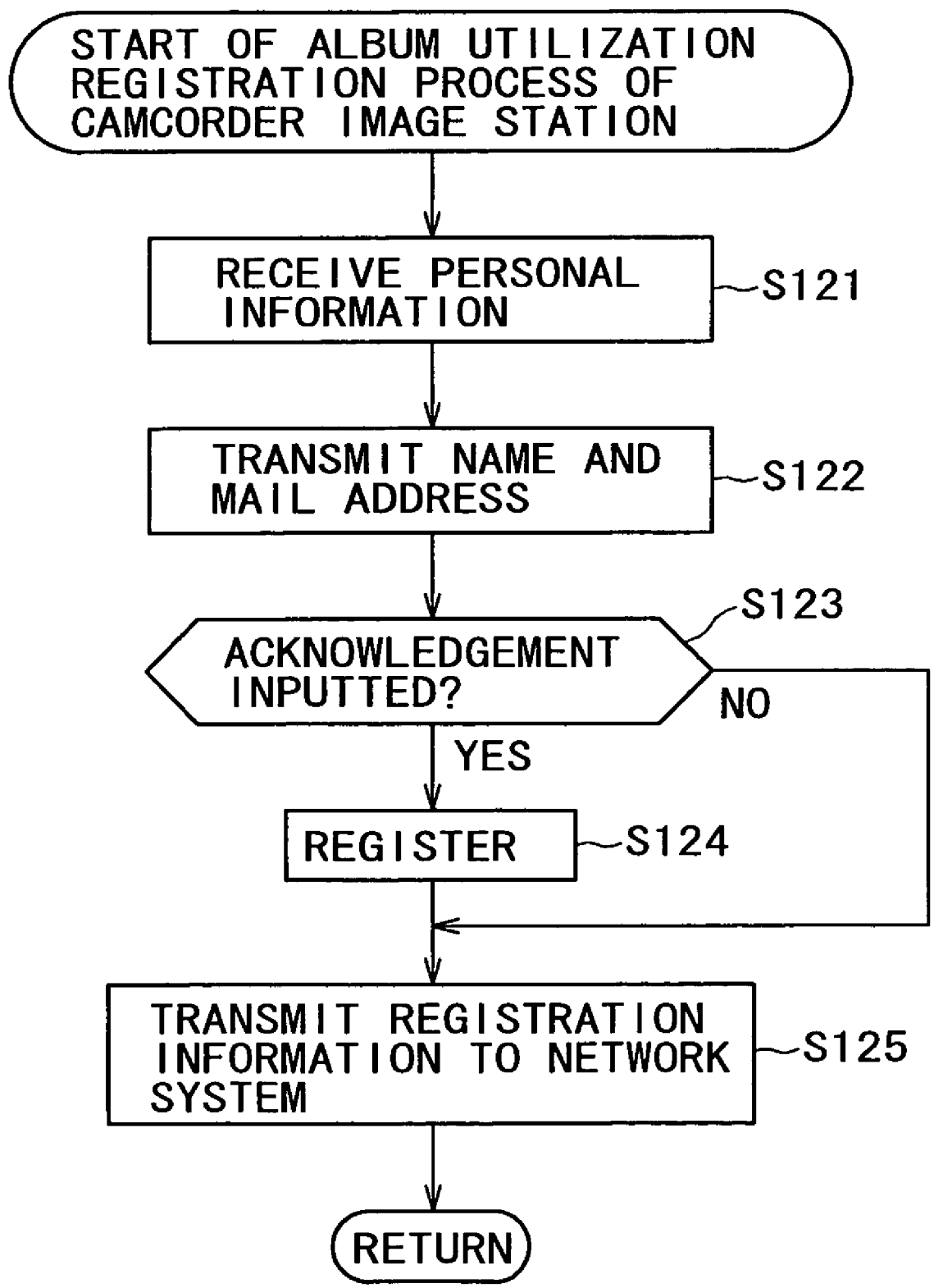
FIG. 16 is a flow chart illustrating an album registration utilization process of the image station for the camcorder of FIG. 2.

The CPU 151 of the camcorder image station 41 receives the personal information of the camcorder 11 transmitted from the customer database 32 of the network system 14 at step S34 of FIG. 9 through the communication section 159 and supplies the personal information to the storage section 158 so that the personal information is stored into the storage section 158 at step S121 of FIG. 16. The CPU 151 reads out the name and the mail address of the received personal information and transmits them to the camcorder 11 at step S122.

After the CPU 71 of the camcorder 11 receives the name and the mail address from the camcorder image station 41, it outputs them to the LCD unit 78 so that they are displayed on the LCD unit 78 at step S101. The user of the camcorder 11 will observe the display to discriminate whether or not the name and the mail address of the user itself are correct. It is to be noted that the mail address (E-mail address) is an E-mail address (FIG. 12) set in the member registration into the Internet service provider A17.

When the user of the camcorder 11 confirms that the name and the mail address are correct, it will operate the input 77 to input, if it acknowledges that the name and the mail address are used for album utilization registration, this. Thus, at step S102, the CPU 71 discriminates whether or not acknowledgement is inputted. If acknowledgement is inputted, then the processing advances to step S103, at which the CPU 71 causes an acknowledgement signal corresponding to the input to be transmitted to the camcorder image station 41.

On the other hand, if the user does not acknowledge the album utilization registration, then the user will operate the inputting section 77 to input this. At this time, the CPU 71 causes a non-acknowledgement signal, which represents that the album utilization registration has not been acknowledged, to be transmitted to the camcorder image station 41 at step S104.

The CPU 151 of the camcorder image station 41 discriminates at step S123 of FIG. 16 whether or not an acknowledgement signal is inputted. If an acknowledgement signal is inputted, then the processing advances to step S124, at which the personal information received at step S121 is stored into the storage section 158.

On the other hand, if it is discriminated at step S123 that an acknowledgement signal is not inputted, then the process at step S124 is skipped.

The personal information corresponding to the temporary ID and the temporary password issued by the network system 14 is registered into the camcorder image station 41 in this manner.

Thereafter, at step S125, the CPU 151 of the camcorder image station 41 transmits, if it is inputted from the user that the registration information should be updated, this to the network system 14.

The customer database 32 of the network system 14 registers the update information into the customer database 32 itself and transmits it to the customer database 52 of the Internet service provider A17 so that it is registered into the customer database 52.

It is to be noted that, after the temporary ID and the temporary password are issued, the customer database 32 of the network system 14 sends a postcard, on which the regular ID and the regular password are carried, to the address of the user. When the user receives the postcard, it will replace the temporary ID and the temporary password with and utilize the regular ID and the regular password.

After the regular ID and the regular password are issued, the customer database 32 transmits them to the network business center 15 and the Internet service provider A17 through the Internet 10. In the network business center 15 and the Internet service provider A17, the regular ID and the regular password are registered individually. The temporary ID and the temporary password can be utilized only for a predetermined period of time (for example, for two weeks) after they are issued, and the network system 14, network business center 15 and Internet service provider A17 individually consider the temporary ID and the temporary password valid only for two weeks and reject accessing thereof if the temporary ID and the temporary password are used after the valid period elapses.

It is to be noted that, while, in the foregoing description, user registration is performed from the camcorder 11 into the network system 14, it is otherwise possible to perform registration from a personal computer through the Internet 10 or registration by a postcard.

Figure 17:
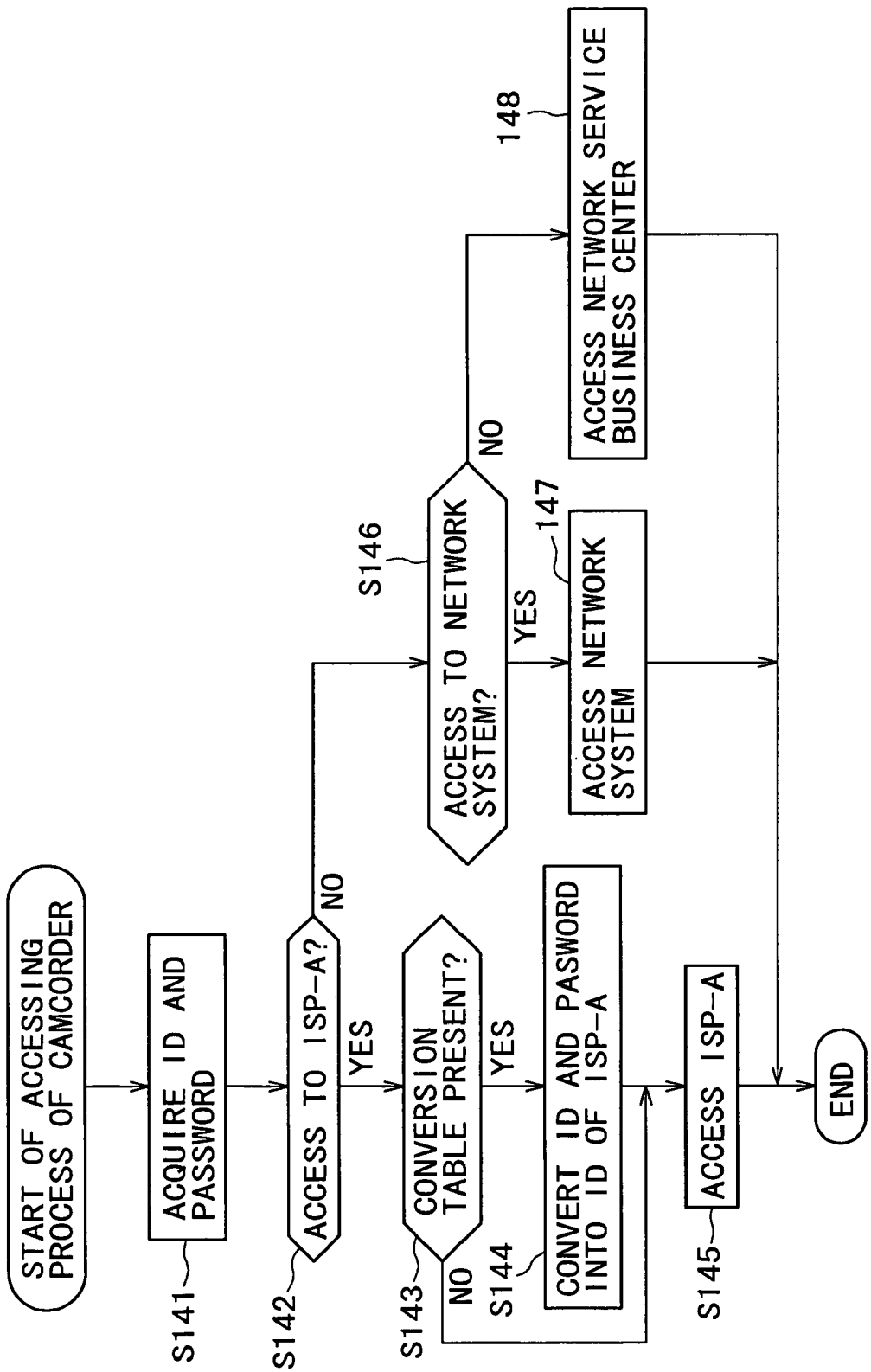
FIG. 17 is a flow chart illustrating an accessing process of the camcorder of FIG. 2.

Subsequently, a process when the camcorder 11 establishes a connection to the network system 14, network business center 15 or Internet service provider 7 is described with reference to a flow chart of FIG. 17. The user will operate the inputting section 77 to input the temporary ID and the temporary password allocated upon user registration into the network system 14 (or the regular ID and the regular password set later). At step S141, the CPU 71 acquires the ID and the password inputted based on the operation of the inputting section 77 by the user. Further, at step S142, the CPU 71 discriminates whether or not the access destination designated by the user is the Internet service provider 7.

If the access destination is the Internet service provider A17, then the processing advances to step S143, at which the CPU 71 discriminates whether or not the conversion table produced at step S63 of FIG. 10 is present. If the conversion table is present (if the user of the camcorder 11 already was a member of the Internet service provider A17 and had the user ID before it performed user registration of the camcorder 11), then the processing advances to step S144, at which the CPU 71 converts the ID and the password acquired at step S141 into the user ID of the Internet service provider A17 based on the conversion table. Then at step S145, the CPU 71 controls the communication section 82 based on the user ID of the Internet service provider A17 to access the Internet service provider A17.

If it is discriminated at step S143 that the conversion table is not present (if the user has performed member registration into the Internet service provider A17 after it purchased the camcorder 11 and performed user registration into the network system 14), then the processing advances to step S145, at which the CPU 71 uses the ID and the password thus inputted to execute a process of accessing to the Internet service provider A17. In this instance, since the customer database 52 of the Internet service provider A17 has the conversion table as described hereinabove, the Internet service provider A17 discriminates based on the conversion table whether or not the camcorder 11 is a legal user.

If it is discriminated at step S142 that the access designation is not the Internet service provider A17, then the processing advances to step S146, at which the CPU 71 discriminates whether or not the access destination is the network system 14. If the access destination is the network system 14, then the processing advances to step S147, at which the CPU 71 accesses the network system 14 based on the ID and the password acquired at step S141. Similarly, if it is discriminated at step S146 that the access destination is not the network system (if it is discriminated that the access destination is the network business center 15), then the processing advances to step S148, at which the CPU 71 makes use of the ID and the password acquired at step S141 to access the network business center 15.

Figure 18:
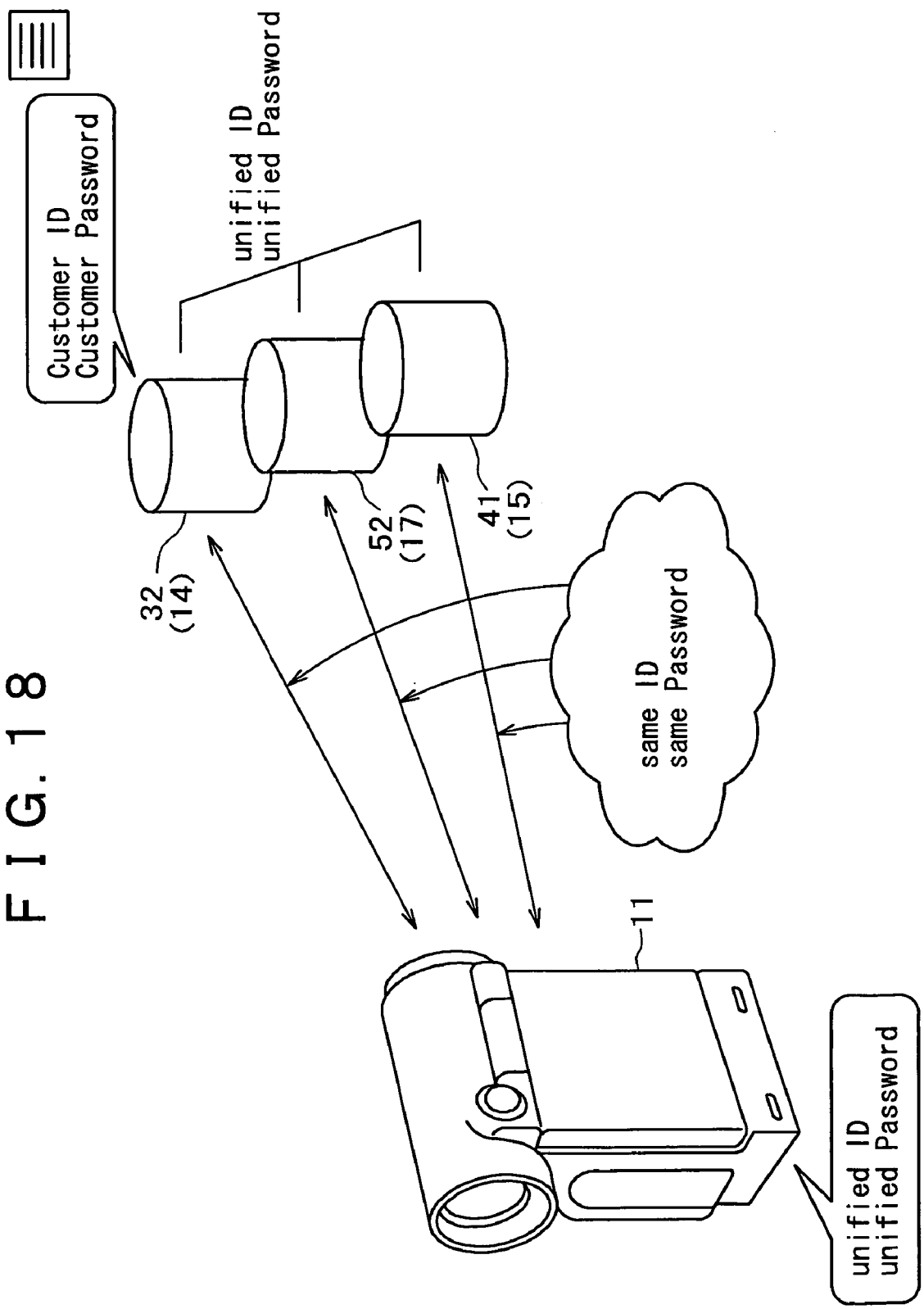
FIG. 18 is a view illustrating utilization of a unified ID and password.

In this manner, in the present service providing system, the user can enjoy a service provided using a temporary ID and a temporary password (same ID and password) issued upon user registration into the network system 14 as the IDs and the passwords for the network system 14, network business center 15 and Internet service provider A17 as seen in FIG. 18.

In such a service providing system as described above, the camcorder 11 can be connected to the Internet 10, for example, through the Internet provider A17 to transmit an electronic mail to which image data are attached or upload image data.

The user will operate a cross key, a determination button, a network button, a network menu button and so forth which compose the inputting section 77 of the camcorder 11 to operate a GUI to attach image data to an electronic mail or upload image data. In the following, the operation method is described.

Figure 19:
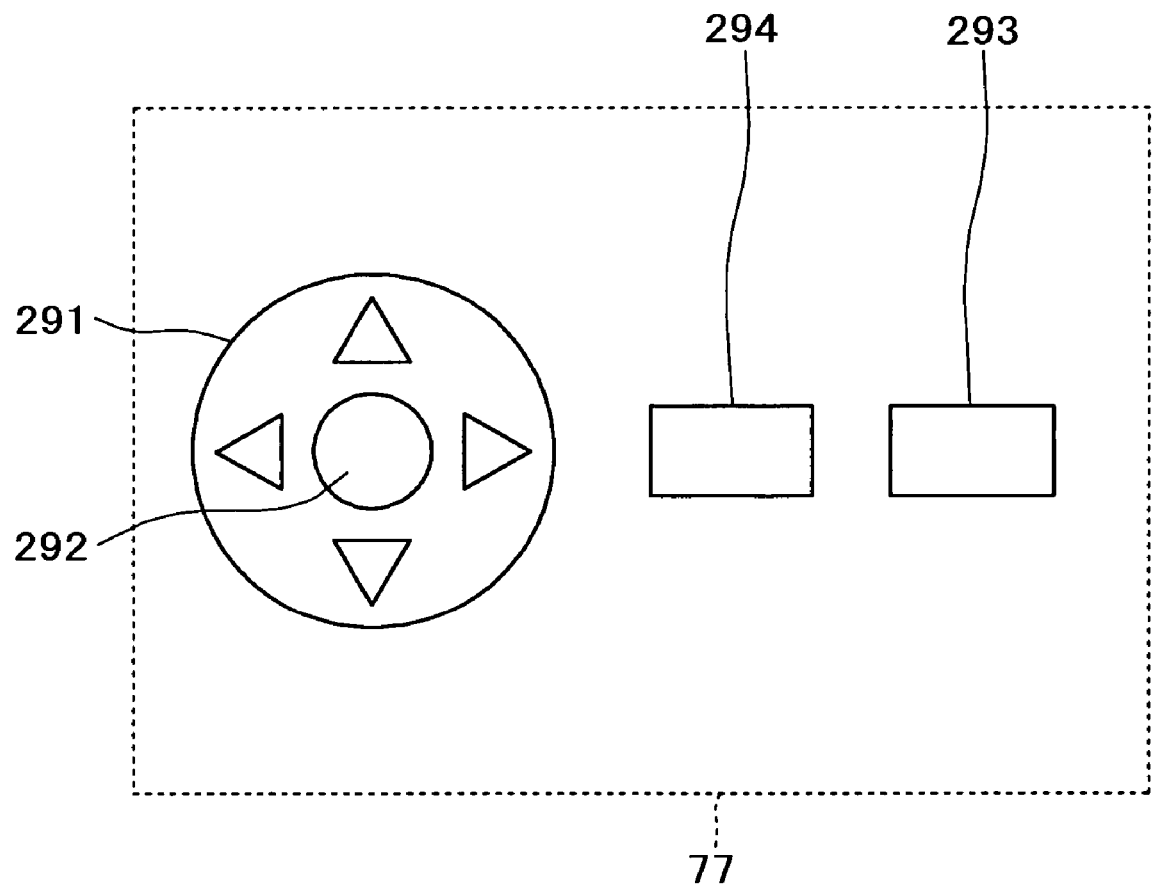
FIG. 19 is a view showing an example of a configuration of buttons included in an inputting section 77 of FIG. 3.

FIG. 19 is a view showing an example of a configuration of a button group included in the inputting section 77 of FIG. 3.

In the example of FIG. 19, the inputting section 77 includes a cross key 291 for moving an anchor in upward and downward directions and leftward and rightward directions, a determination button 292 for issuing an instruction to execute a process, a network button 293 for displaying a screen for selection of a network function, and a network menu button 294 for displaying a menu button which is a GUI for allowing various processes to be selected.

The cross key 291 is a button provided on a housing of the camcorder 11, and triangles indicative of the upward, downward, leftward and rightward directions are displayed on the cross key 291. If the user operates a portion of the cross key 291 in the proximity of one of the triangles, then an anchor displayed on the LCD unit 78 is moved in the direction indicated by the triangle.

For example, if the user operates a portion of the cross key 291 in the proximity of the triangle indicative of the upward direction, then the anchor displayed on the LCD unit 78 moves from a position at which it is currently displayed to another position at which the anchor can be positioned such as a button present in the upward direction. Also when the user operates a portion of the cross key 291 in the proximity of the triangle indicative of the downward direction, rightward direction or leftward direction, the anchor moves to a next button or the like present in the direction indicated by the triangle. In this manner, the user can operate the anchor displayed on the LCD unit 78 by operating the cross key 291.

It is to be noted that the indication indicative of a direction on the cross key 291 is not limited to a triangle but may have any shape only if it indicates a direction, and such indications may be provided around the cross key 291. Further, the directions indicated by the cross key 291 are not limited to the upward, downward, leftward and rightward directions, but may be any directions such as four directions of the obliquely rightwardly upward direction, obliquely rightwardly downward direction, obliquely leftwardly upward direction and obliquely leftwardly downward direction.

The determination button 292 is a button provided on the housing of the camcorder 11 and is a button formed together with the cross key 291. The determination button 292 is provided at the center of the cross key 291 and surrounded by the portions of the cross key 291 which indicate the upward, downward, leftward and rightward directions. If the user operates the central portion of the cross key 291, that is, the determination button 292, then a process corresponding to a button or the like at which the anchor is positioned is executed.

For example, the user can operate the cross key 291 to position the anchor at an object button on a GUI displayed on the LCD unit 78 and operate the determination button 292 to execute an arbitrary process.

It is to be noted that the determination button 292 is formed as a separate member from the cross key 291.

The network button 293 is a button provided on the housing of the camcorder 11 and is a button for displaying a GUI for performing a process regarding a network on the LCD unit 78. For example, if the user operates the network button 293, then such a network menu screen as shown in FIG. 21 is displayed on the LCD unit 78. The user can cause a function regarding a network to operate based on the network menu screen.

The network menu button 294 is a button provided on the housing of the camcorder 11 and is a button for causing the LCD unit 78 to display a GUI for performing a process regarding WEB contents displayed on the LCD unit 78.

It is to be noted that the network button 293 and the network menu button 294 may be formed as a single button. In this instance, when the button is operated by the user, the process indicated by the button varies based on a GUI displayed on the LCD unit 78.

By operating the buttons formed on the inputting section 77 in such a manner as described above, the user can perform various processes based on a GUI displayed on the LCD unit 78.

FIG. 20 is a view showing an example of a monitor image displayed on the LCD unit 78.

In the example of FIG. 20, a monitor image 300 fetched by the image pickup section 80 is displayed on the LCD unit 78. Further, an image pickup information section 311 is provided at an upper portion, and various kinds of information regarding the image pickup is displayed in a superposed relationship with the monitor image 300 in the image pickup information section 311. Further, at a lower portion, buttons for instruction of execution of various processes based on the GUI are displayed in a superposed relationship with the monitor image 300.

A pair of zoom buttons 321A and 321B are buttons for indicating adjustment of the focal distance of an image to be fetched by the image pickup section 80.

A network button 322 is a button for selecting a function of the camcorder 11 regarding a network.

A still picture mode button 323 is a button for selecting a still picture image pickup function of the camcorder 11. Meanwhile, an index button 324 is a button for instruction of display of information regarding image data or sound data recorded on a cassette magnetic tape loaded. Further, a function button 325 is a button for instruction of display of a GUI for operating various functions such as a setting function.

The anchor representative of indication by the user is positioned at one of the zoom buttons 321A and 321B, network button 322, still picture mode button 323, index button 324 and function button 325.

Thus, the user can move the position of the anchor to another button by operating the cross key 291 of the inputting section 77 so as to indicate the rightward direction or the leftward direction. If the user operates the determination button 292 of the inputting section 77, then a process corresponding to the button at which the anchor is positioned is executed.

In the example of FIG. 20, the anchor is positioned at the network button 322. In this instance, if the user operates the cross key 291 of the inputting section 77 so as to indicate the rightward direction, then the anchor moves to the still picture mode button 323, but otherwise if the user operates the cross key 291 so as to indicate the leftward direction, then the anchor moves to the zoom button 321B.

If the anchor is positioned at the network button 322 and the user operates the determination button 291 of the inputting section 77, then a network menu screen which is a GUI for selection of a process regarding a network to be executed is displayed on the LCD unit 78. Also when the network button 293 of the inputting section 77 is operated, the network menu screen is displayed on the LCD unit 78.

FIG. 21 is a view showing an example of the network menu screen displayed on the LCD unit 78.

In the example of FIG. 21, provided on the network menu screen 330 are a browser button 331 for rendering a browser function operative, a setting button 332 for performing various settings regarding a network, a mail button 333 for rendering a mail function operative, a Web album button 334 for rendering a function regarding a WEB album operative and an end button 335 for closing the network menu screen 330 to end the process regarding the network and restoring the monitor image 300 shown in FIG. 20.

Figure 22:
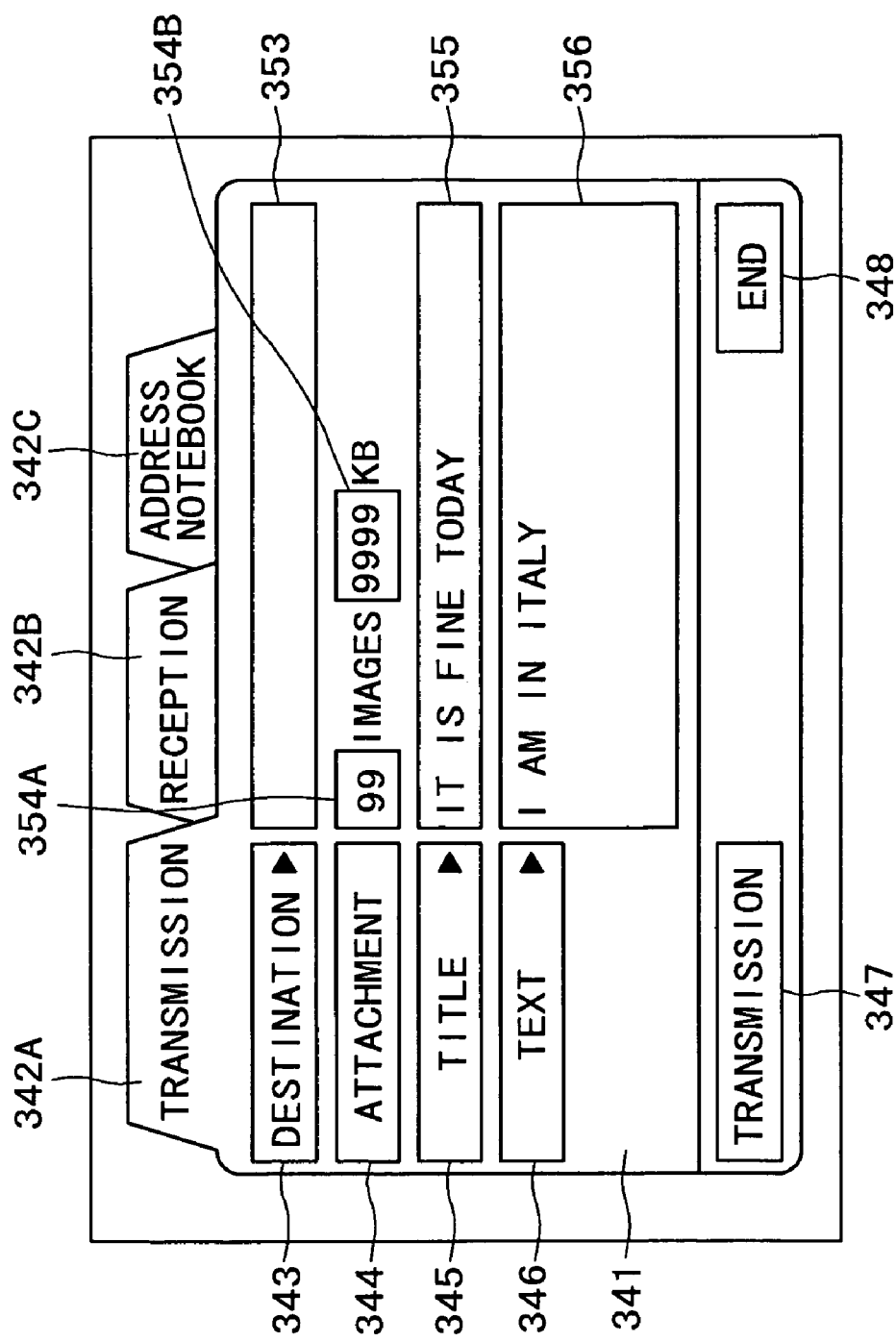
FIG. 22 is a view showing an example of a display of a transmission tab screen displayed on the LCD unit 78.

If the user operates the cross key 291 of the inputting section 77 to position the anchor at the mail button 333 and operates the determination button 292 in the example of FIG. 21, then the CPU 71 of the camcorder 11 renders the mail function operative and controls the LCD unit 78 to display such a GUI for transmitting an electronic mail as shown in FIG. 22.

FIG. 22 is a view showing an example of a display of a transmission tab screen displayed on the LCD unit 78.

In the example of FIG. 22, the transmission tab screen 341 is a screen displayed when the user operates the cross key 291 to position the anchor at a transmission tab 342A and operates the determination button 292. Similarly, if the user operates the cross key 291 to position the anchor at a reception tab 342B and operates the determination button 292, then a reception tab screen (not shown) for performing reception of a mail is displayed. Further, if the user operates the cross key 291 to position the anchor at a address notebook tab 342C and then operates the determination button 292, then an address notebook screen (not shown) having a function of an address notebook is displayed. When the mail button 333 of FIG. 21 is operated, the transmission tab screen 341 shown in FIG. 22 may otherwise be displayed first. Alternatively, the reception tab screen may be displayed first, or the address notebook tab screen may be displayed first.

In the example of FIG. 22, a destination button 343 for performing a process regarding inputting of a destination, an attachment button 344 for performing a process regarding selection of an image file to be attached to an electronic mail to be transmitted, a title button 345 for performing a process regarding inputting of a title, a text button 346 for inputting a text, a transmission button 347 for transmitting an electronic mail and an end button 348 for ending a transmission operation of an electronic mail and restoring the network menu screen 330 of FIG. 21 are provided on the transmission tab screen 341.

A destination display section 353 for displaying an inputted destination is provided on the right side of the destination button 343, and an attached image number display section 354A for indicating the number of images selected as attached images and a data size display section 354B for indicating a total data size of the image data selected as the attached images are provided on the right side of the attachment button 344. Further, a title display section 355 for displaying an inputted title is provided on the right side of the title button 345, and a text display section 356 for displaying an inputted text is provided on the right side of the text display section 356.

The user will operate the destination button 342 to text button 346 of the transmission tab screen 341 to prepare an electronic mail and operate the transmission button 347 to transmit the prepared electronic mail. Further, if the user wants to stop a preparation operation of an electronic mail or the like, then it will operate the end button 348 to end the electronic mail transmission operation.

If the user operates the anchor to select the mail button 333 in FIG. 21, then the CPU 71 of the camcorder 11 controls the LCD unit 78 to display the transmission tab screen 341 of FIG. 22 and executes a mail transmission mode process.

The mail transmission mode process by the CPU 71 is described with reference to a flow chart of FIG. 23.

First at step S201, the CPU 71 discriminates whether or not the user operates the anchor to operate the destination button 343. If it is discriminated that the destination button 343 is operated, then the CPU 71 advances the processing to step S202, at which it causes a character inputting screen to be displayed and accepts inputting of a destination.

Figure 24:
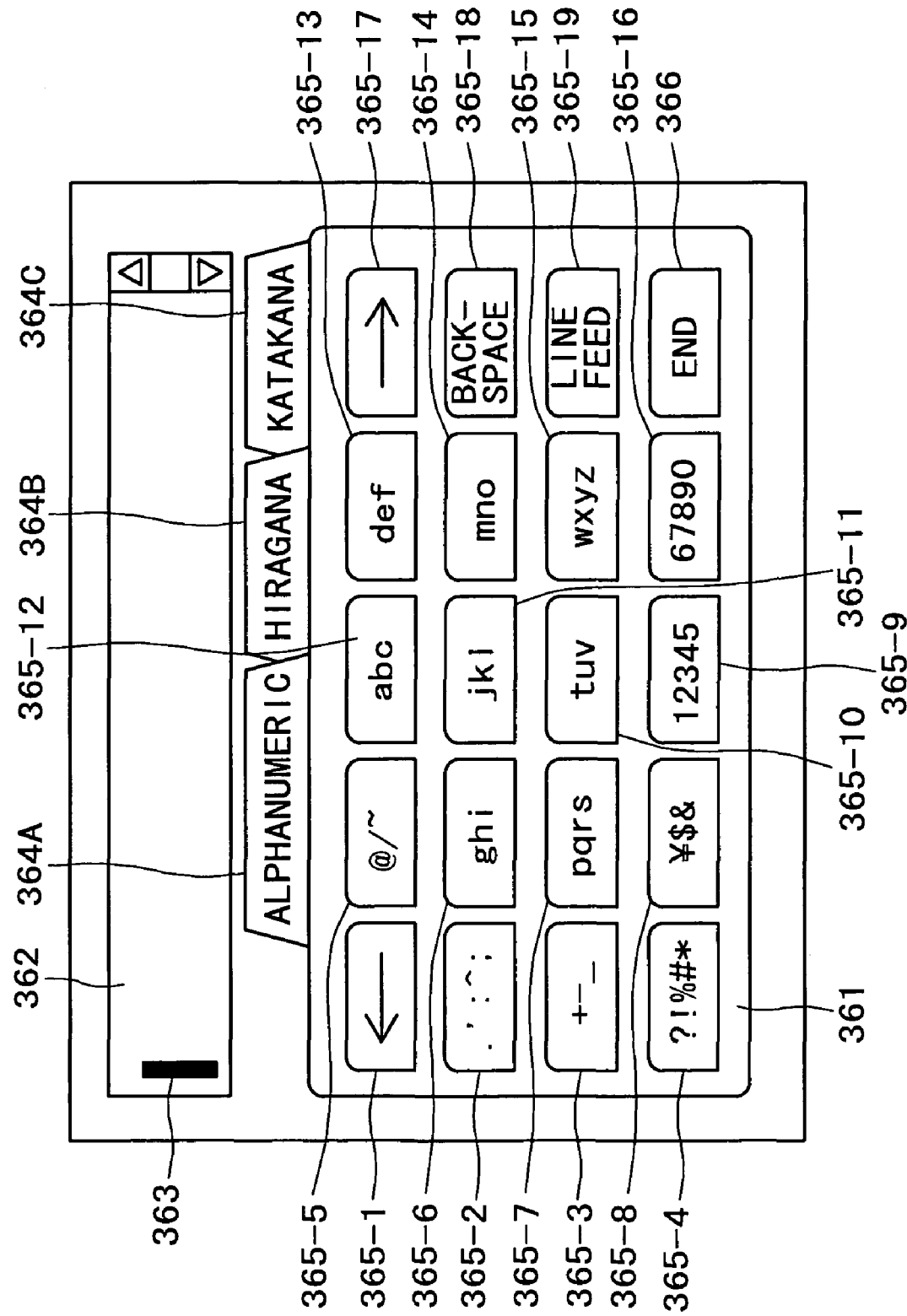
FIG. 24 is a view showing an example of a display of a character inputting screen displayed on the LCD unit 78.

FIG. 24 is a view showing an example of a display of the character inputting screen displayed on the LCD unit 78.

In the example of FIG. 24, the character inputting screen 361 includes a character input blank 362 for displaying inputted characters, numerals and symbols, a cursor 363 indicative of the position at which a character, numeral or symbol is to be inputted in the character input blank 362, an alphanumeric tab 364A indicative of a mode in which alphanumeric characters and symbols are inputted, a 'hiragana' tab 364B indicative of another mode in which 'hiragana' and 'kanji' characters are inputted, a 'katakana' tab 364C indicative of a further mode wherein 'katakana' characters are inputted, buttons 365-1 to 365-19 for indicating a process regarding inputting of characters (including numerals and symbols) and an end button 366 for closing the character inputting screen and end the character inputting operation.

On the character inputting screen 361 shown in FIG. 24, the user will operate the cross key 291 to position the anchor at the alphanumeric tab 364A, 'hiragana' tab 364B or 'katakana' tab 364C to select an input mode (type of characters). In the example of FIG. 24, the alphanumeric tab 364A is selected.

The user having positioned the anchor at a tab to select an input mode will operate the cross key 291 to position the anchor at one of the buttons 365-1 to 365-19 and operate the determination button 292 to operate the GUI.

In the example of FIG. 24, the button 365-1 and the button 365-17 are buttons for operating the position of the cursor 363. If the user operates the cross key 291 to position the anchor at the button 365-1 and then operates the determination button 292, then the cursor 363 moves leftwardly by one character distance. However, if no character is present on the left side of the cursor 363, then the cursor 363 does not move. Similarly, if the user operates the cross key 291 to position the anchor at the button 365-17 and operates the determination button 292, the cursor 363 moves rightwardly by one character distance. However, if no character is present on the right side of the cursor 363, then the cursor 363 does not move.

If the button 365-18 is operated, then that one (including the line feed character) of characters (including numerals and symbols) displayed in the character input blank 362 which is positioned on the left side of the cursor 363 is erased, and the cursor 363 and those characters (including the line feed character) on the right side of the cursor 363 are moved leftwardly by one character distance. However, if no character is present on the left side of the cursor 363 (if there is no character to be erased), then the cursor 363 does not move.

If the button 365-19 is operated, then the cursor 363 displayed in the character input blank 362 is line-fed and thus displayed on the line lower by one line distance.

If the user operates the cross key 291 to move the anchor and operates the determination button 292 to operate any one of the buttons 365-2 to 365-16, then a character, numeral or symbol displayed on the button is inputted. The inputted character is displayed at the position of the cursor 363 of the character input blank 362. At this time, the cursor 363 moves rightwardly by one character distance. The characters displayed on the buttons 365-2 to 365-16 differ depending upon the tab selected, and also characters inputted differ correspondingly.

If the buttons 365-2 to 365-5 and the button 365-8 in the example of FIG. 24 are operated, then symbols are inputted, but if the buttons 365-6 and 365-7 and the buttons 365-10 and 365-15 are operated, then alphabets are inputted whereas, when the buttons 365-9 and 365-16 are operated, numerals are inputted.

While a plurality of symbols, alphabets or numerals are displayed on each of the buttons 365-2 to 365-16, if the determination button 292 is operated, then one symbol or one character is inputted by the following process.

For example, if the user operates the determination button 292 with the anchor positioned at the button 36511, then the character "j" is inputted and displayed at the position of the cursor 363 in the character input blank 362. Thereupon, the cursor 363 moves rightwardly by one character distance. Then, if the user operates the determination button 292 again, then the character "j" displayed in the character input blank 362 is erased and the character "k" is displayed. Similarly, if the user operates the determination button 292, then the character "k" is erased and the character "l" is displayed. In other words, the character to be inputted changes depending upon the number of times by which the determination button 292 is operated. In the case of the button 365-11, six different characters "j", "k", "l", "J", "K" and "L" are inputted. It is to be noted that, if the determination button 292 is operated in a state wherein the character "L" is displayed, then the character "L" is erased and the character "j" is displayed.

A character displayed is decided if the cross key 291 is operated to move the anchor. If a character is decided, then the position at which a character inputted is to be displayed in the character input blank 362 returns to the position of the cursor 363. In other words, the display position moves rightwardly by one character distance.

As described above, the user can input a character by operating the cross key 291 and the determination button 292.

It is to be noted that the characters, numerals and symbols inputted using the buttons 365-2 to 365-16 may be other characters than the characters, numerals and symbols displayed on the character inputting screen 361.

The user who has completed inputting of characters will operate the end button 366 to restore the transmission tab screen 341 of FIG. 22. The inputted destination is displayed in the destination display section 353 of FIG. 22.

Referring back to FIG. 23, after the inputting of the destination is completed, the CPU 71 advances the processing to step S203. Further, when it is discriminated at step S201 that the user does not operate the anchor to operate the destination button 343 of FIG. 22, the CPU 71 advances the processing to step S203.

At step S203, the CPU 71 discriminates whether or not the user operates the anchor to operate the attachment button 344. If it is discriminated that the attachment button 344 is operated, then the CPU 71 advances the processing to step S204, at which it performs an attached image selection process. Details of the attached image selection process are hereinafter described. When the attached image selection process is ended, the number of selected images is displayed in the attached image number display section 354A of FIG. 22, and the total data size of the images is displayed in the data size display section 354B. After the attached image selection process is ended, the CPU 71 advances the processing to step S205.

If it is discriminated at step S203 that the user does not operate the anchor to operate the attachment button 344, then the CPU 71 advances the processing to step S205.

At step S205, the CPU 71 discriminates whether or not the user operates the anchor to operate the title button 345. If it is discriminated that the title button 345 is operated, then the CPU 71 advances the processing to step S206, at which it causes the character inputting screen of FIG. 24 to be displayed and accepts an input of a title. Description of the inputting method is omitted because it is similar to that in the case wherein a destination is inputted. The inputted title is displayed in the title display section 355.

If the user completes the inputting of the title and then operates the end button 366, then the CPU 71 advances the processing to step S207. On the other hand, when it is discriminated at step S205 that the user does not operate the anchor to operate the title button 345, the CPU 71 advances the processing to step S207.

At step S207, the CPU 71 discriminates whether or not the user operates the anchor to operate the text button 346. If it is discriminated that the text button 346 is operated, then the CPU 71 advances the processing to step S208, at which it performs a text editing process. Details of the text editing process are hereinafter described. When the text editing process comes to an end, the inputted text is displayed in the text display section 356 of FIG. 22. After the text editing process comes to an end, the CPU 71 advances the processing to step S209.

If it is discriminated at step S207 that the user does not operate the anchor to operate the text button 346, then the CPU 71 advances the processing to step S209.

At step S209, the CPU 71 discriminates whether or not the user operates the anchor to operate the transmission button 347. If it is discriminated that the transmission button 347 is operated, then the CPU 71 advances the processing to step S210, at which it controls the communication section 82 to establish a connection to the network and transmit the inputted electronic mail.

Figure 25:
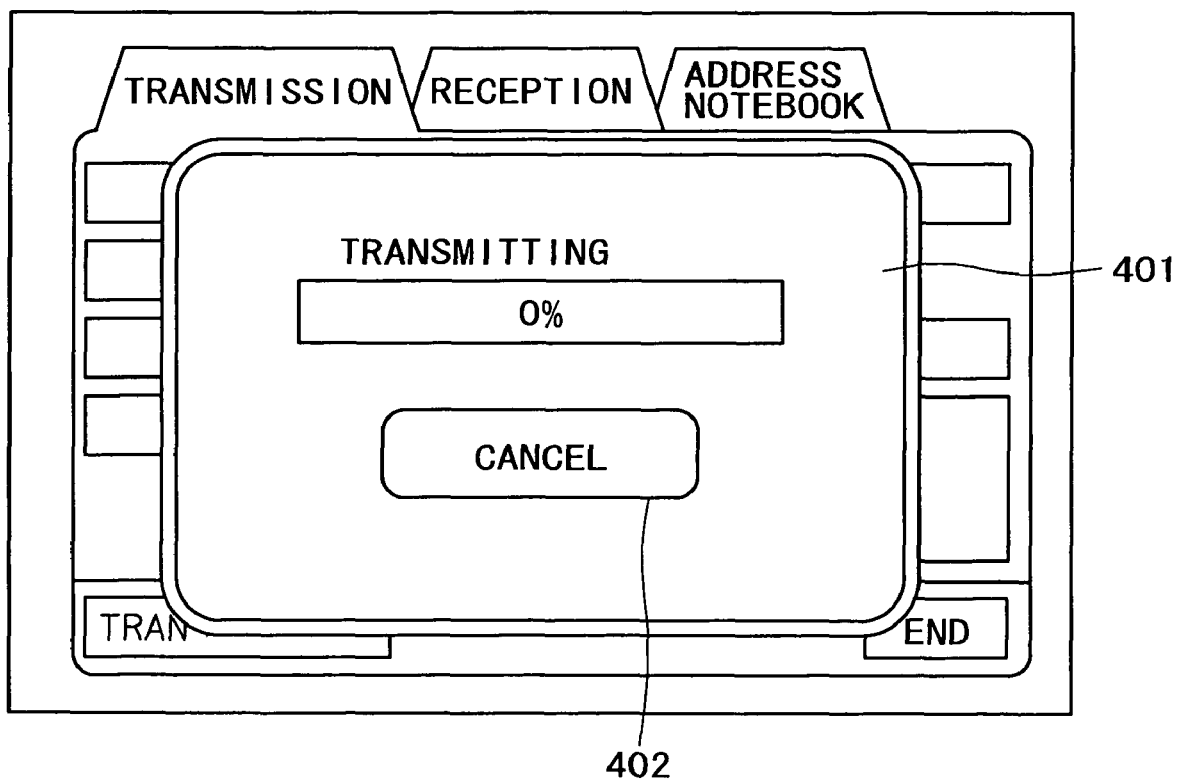
FIG. 25 is a view showing an example of a display of a transmission state confirmation screen displayed when a process for transmitting an electronic mail is proceeding.

FIG. 25 is a view showing an example of a display of a transmission state confirmation screen displayed when a process of transmitting an electronic mail is proceeding.

In the example of FIG. 25, a message of "Transmitting" is displayed in a transmission state confirmation screen 401 and an indicator indicative of a proceeding situation of the transmission process is displayed below the transmission state confirmation screen 401, and a cancel button 402 for stopping the transmission process is provided below the indicator.

The user will refer to the indicator of the transmission state confirmation screen 401 to grasp the proceeding situation of the electronic mail transmission process and, when it wants to stop the process, operate the determination button 292 which composes the inputting section 77 to operate the cancel button 402. If the cancel button 402 is operated by the user, then the CPU 71 cancels the transmission process and restores the transmission tab screen 341 of FIG. 22.

After the transmission of the electronic mail is completed, the CPU 71 ends the mail transmission mode process.

On the other hand, if it is discriminated at step S209 that the user does not operate the anchor to operate the transmission button 347, then the CPU 71 advances the processing to step S211.

At step S211, the CPU 71 discriminates whether or not the user operates the anchor to operate the end button 348. If it is discriminated that the end button 348 is operated, then the CPU 71 advances the processing to step S212, at which it controls the LCD unit 78 to display the network menu screen 330 of FIG. 21 and ends the mail transmission mode process.

If it is discriminated at step S211 that the user does not operate the anchor to operate the end button 384, then the CPU 71 advances the processing to step S213.

At step S213, the CPU 71 discriminates whether or not the user operates the anchor to operate the reception tab 342B of FIG. 22. If it is discriminated that the reception tab 342B is operated, then the CPU 71 advances the processing to step S214, at which it controls the LCD unit 78 to display the reception tab screen and performs a process regarding reception, whereafter it ends the mail transmission mode process.

On the other hand, if it is discriminated at step S213 that the user does not operate the anchor to operate the reception tab 342B, then the CPU 71 advances the processing to step S215.

At step S215, the CPU 71 discriminates whether or not the user operates the anchor to operate the address notebook tab 342C. If it is discriminated that the address notebook tab 342C is operated, then the CPU 71 advances the processing to step S216, at which it controls the LCD unit 78 to display the address notebook tab screen and performs a process regarding an address notebook and then ends the mail transmission mode process.

On the other hand, if it is discriminated at step S215 that the user does not operate the anchor to operate the address notebook tab 342C, then the CPU 71 returns the processing to step S201 so that it thereafter executes the processes at the steps beginning with step S201.

As described above, when the CPU 71 performs the mail transmission mode process, the user can operate the GUI of the transmission tab screen 341 of FIG. 22 to prepare an electronic mail to be transmitted and attach a plurality of images to the mail readily.

Figure 23:
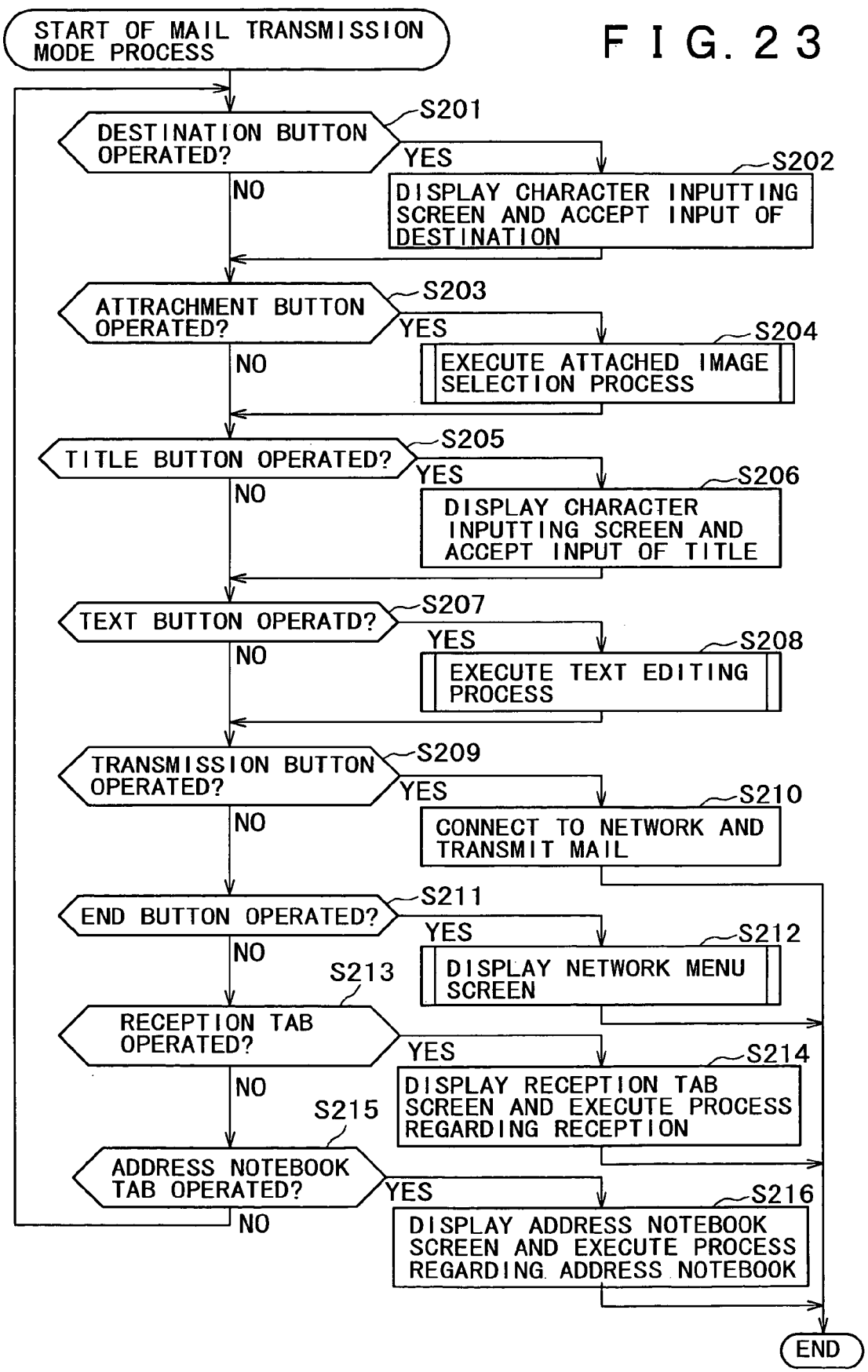
FIG. 23 is a flow chart illustrating a mail transmission mode process by a CPU 71.

Subsequently, details of the attached image selection process performed at step S204 of FIG. 23 are described with reference to flow charts of FIGS. 26 and 27.

If the user operates the anchor on the transmission tab screen 341 of FIG. 22 to operate the destination button 343, then the CPU 71 first controls the LCD unit 78 to display the image selection screen at step S231.

Figure 28:
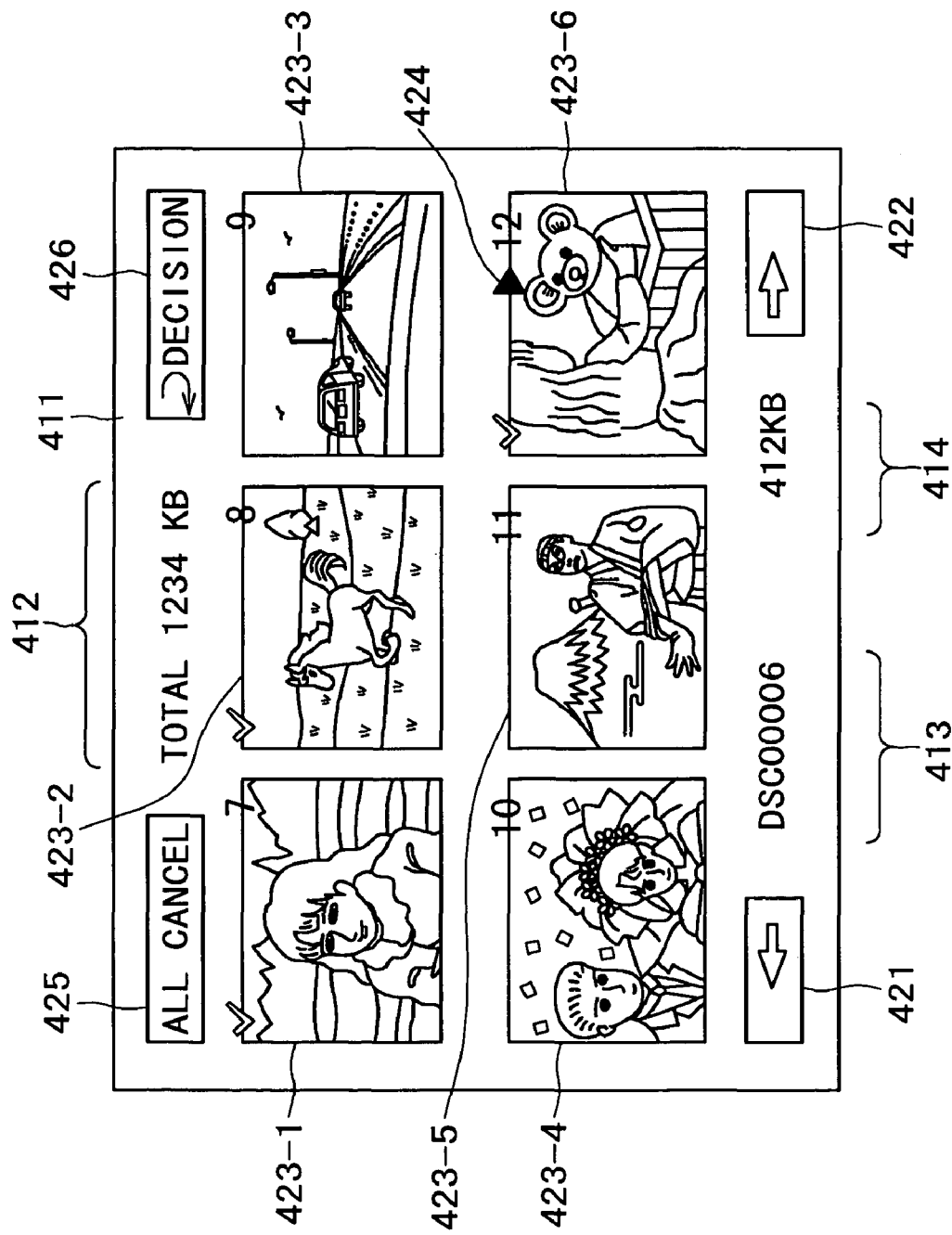
FIG. 28 is a view showing an example of a display of an image selection screen displayed on the LCD unit 78.

FIG. 28 is a view showing an example of a display of the image selection screen displayed on the LCD unit In the example of FIG. 28, a total data size 412 indicative of the total data size of image data selected as attached images by the user is displayed at the center of an upper portion of an image selection screen 411. Further, a data name display section 413 indicative of the data name of image data at which an anchor 424 is positioned and a data size display section 414 indicative of the data size of the image data are displayed at the center of a lower portion of the image selection screen 411.

Further, a page backward feeding button 421 is provided on the left side of the data name display section 413, and a page feeding button 422 is provided on the right side of the data size display section 414. The user will operate the anchor 424 to operate the page backward feeding button 421 or the page feeding button 422 to change over image data to be displayed.

Further, image data which make an object of selection of an attached image are displayed as thumbnail images 423-1 to 423-6 on the image selection screen 411. While, in the example of FIG. 28, six images are displayed, the number of images is not limited to this and any number of images may be displayed. Image data displayed as thumbnail images have been picked up by the user and are stored in the RAM 73, EEPROM 74, recording and reproduction section 83 or memory card 85.

On the left side at an upper portion of the image selection screen 411, an all cancel button 425 for canceling checks of thumbnail images selected as attached images is provided. Further, on the right side at the upper portion of the image selection screen 411, a determination button 426 for completing the image selection operation is provided.

On the image selection screen 411, the user will use the cross key 291 and the determination button 292 of the inputting section 77 to operate the anchor 424 to operate the page backward feeding button 421 and the page feeding button 422 to select thumbnail images displayed. At a right upper portion of each of the thumbnail images 423-1 to 423-6 displayed, the number representative of an order number of the thumbnail image is displayed.

It is shown that, by an operation of the user, the anchor 424 is positioned on the left side of the number of a thumbnail image designated by the user and indicates that the thumbnail image is designated. Then, if the user operates the determination button 292 of the inputting section 77, then the image data of the thumbnail image at which the anchor 424 is positioned are selected. At a left upper portion of the selected thumbnail image, a check mark representing that the thumbnail image is selected is displayed. It is to be noted that the number of thumbnails which can be selected is a predetermined number determined in advance or any number only if a predetermined data size is not exceeded.

Further, if image data of a thumbnail image selected as an attached image and having a check mark displayed therefor are selected again by the user, then the selection of the image data is canceled and the display of the check mark disappears.

In the example of FIG. 28, the anchor 424 is positioned at the thumbnail image 423-6 of the number 12, and the thumbnail image 423-1 of the number 7, the thumbnail image 423-2 of the number 8 and the thumbnail image 423-6 of the number 12 are selected as attached images.

If the user wants to cancel all of the selected attached images, then the user will use the cross key 291 and the determination button 292 of the inputting section 77 to operate the anchor 424 to operate the all cancel button 425 to cancel the selection of all of the image data and perform an image selection operation again from the beginning.

When the user wants to end the image selection operation, the user will operate the anchor to operate the determination button 426. If the determination button 426 is operated, then the transmission tab screen of FIG. 22 is displayed on the LCD unit 78 and a result of the image selection operation is reflected.

Referring back to FIG. 26, the CPU 71 which has controlled the LCD unit 78 to display the image selection screen 411 at step S231 advances the processing to step S232, at which it discriminates whether or not the user operates the page backward feeding button 421 of FIG. 28. If it is discriminated that the page backward feeding button 421 is operated, then the CPU 71 advances the processing to step S233, at which it discriminates whether or not a preceding page is present on the currently displayed image selection screen 411. If it is discriminated that a preceding page is present, then the CPU 71 advances the processing to step S234, at which it controls the LCD unit 78 to display the preceding page. The CPU 71 which has caused the preceding image to be displayed advances the processing to step S235.

If it is discriminated at step S233 that a preceding page is not present, then the CPU 71 advances the processing to step S235. Further, when it is discriminated at step S232 that the user does not operate the anchor to operate the page backward feeding button 421, then the CPU 71 advances the processing to step S235.

At step S235, the CPU 71 discriminates whether or not the user operates the page feeding button 422. If it is discriminated that the user operates the page feeding button 422, then the CPU 71 advances the processing to step S236, at which it discriminates whether or not a next page to the currently displayed image selection screen 411 is present. If it is discriminated that a next page is present, then the CPU 71 advances the processing to step S237, at which it controls the LCD unit 78 to display the next page. The CPU 71 having caused the next page to be displayed advances the processing to step S238 of FIG. 27.

Figure 27:
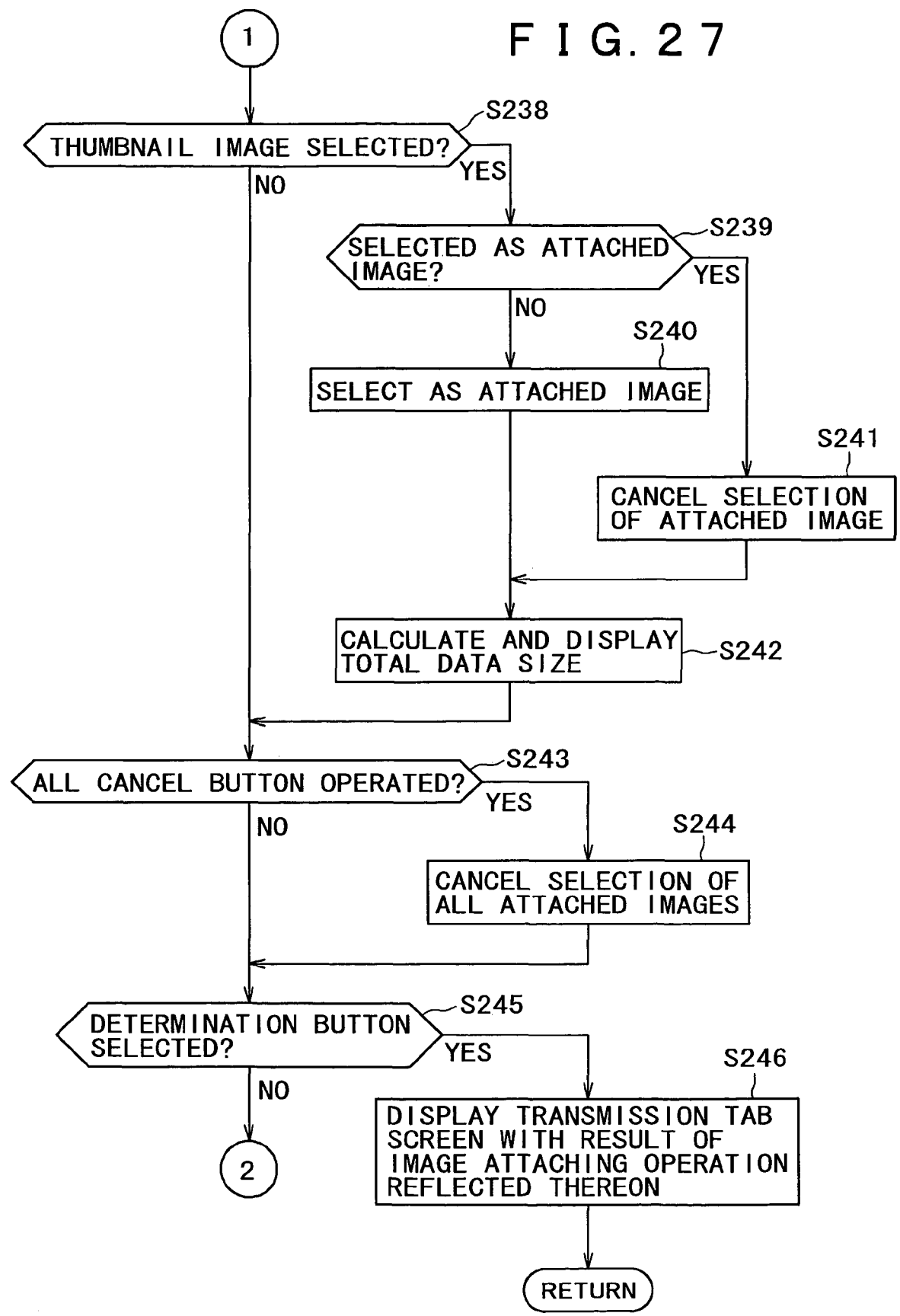
FIG. 27 is a flow chart continuing from that of FIG. 25 illustrating details of the attached image selection process performed at step S204 of FIG. 22.

If it is discriminated at step S236 that a next page is not present, then the CPU 71 advances the processing to step S238 of FIG. 27. Further, when it is discriminated at step S235 that the user does not operate the anchor to operate the page feeding button 422, the CPU 71 advances the processing to step S238 of FIG. 27.

At step S238, the CPU 71 discriminates whether or not the user operates the anchor to select one of the thumbnail images 423-1 to 423-6. If it is discriminated that one of the thumbnail images 423-1 to 423-6 is selected, then the CPU 71 advances the processing to step S239, at which it discriminates whether or not the selected thumbnail image is selected already as an attached image. If it is discriminated that the selected thumbnail image is not selected, then the CPU 71 advances the processing to step S240, at which it selects the thumbnail image as an attached image, and then advances the processing to step S242.

On the other hand, if it is discriminated at step S239 that the selected thumbnail is selected already as an attached image, then the CPU 71 cancels the selection of the thumbnail image as an attached image, and then advances the processing to step S242.

At step S242, the CPU 71 calculates a total data size of the selected attached image data and displays the total data size in the total data size display section 412. After the process at step S242 is completed, the CPU 71 advances the processing to step S243.

On the other hand, if it is discriminated at step S238 that the anchor 424 is not operated to select a thumbnail image by the user, then the CPU 71 advances the processing to step S243.

At step S243, the CPU 71 discriminates whether or not the user operates the anchor 424 to operate the all cancel button 425. If it is discriminated that the all cancel button 425 is operated, then the CPU 71 advances the processing to step S244, at which it cancels the selection of all attached images. The CPU 71 having canceled the selected of all attached images advances the processing to step S245.

On the other hand, if it is discriminated at step S243 that the user does not operate the anchor 424 to operate the all cancel button 425, then the CPU 71 advances the processing to step S245.

At step S245, the CPU 71 discriminates whether or not the user operates the anchor 424 to operate the determination button 426. If it is discriminated that the determination button 426 is operated, then the CPU 71 advances the processing to step S246, at which it controls the LCD unit 78 to display the transmission tab screen 341 of FIG. 22 on which a result of the image attaching operation is reflected. The CPU 71 having ended the process at step S246 ends the attached image selection process and advances the processing to step S205 of FIG. 23.

Figure 26:
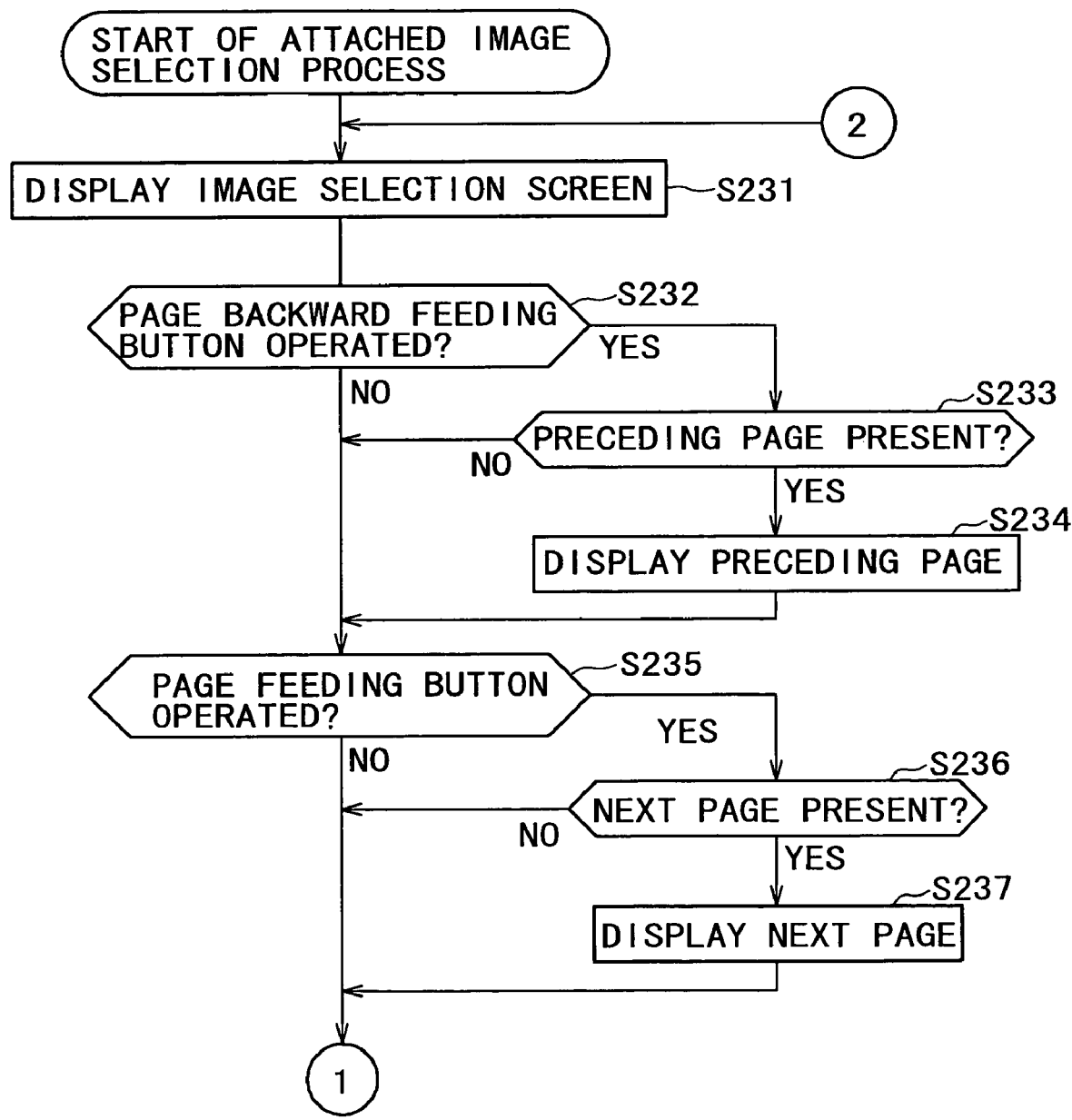
FIG. 26 is a flow chart illustrating details of an attached image selection process executed at step S204 of FIG. 22.

On the other hand, if it is discriminated at step S245 that the user does not operate the anchor 424 to operate the determination button 426, then the CPU 71 returns the processing to step S231 of FIG. 26 so that the processes at the steps beginning with step S231 are repeated.

The attached image selection process is performed in such a manner as described above, and the user can utilize the image selection screen 411 of FIG. 28 to select an attached image.

Figure 29:
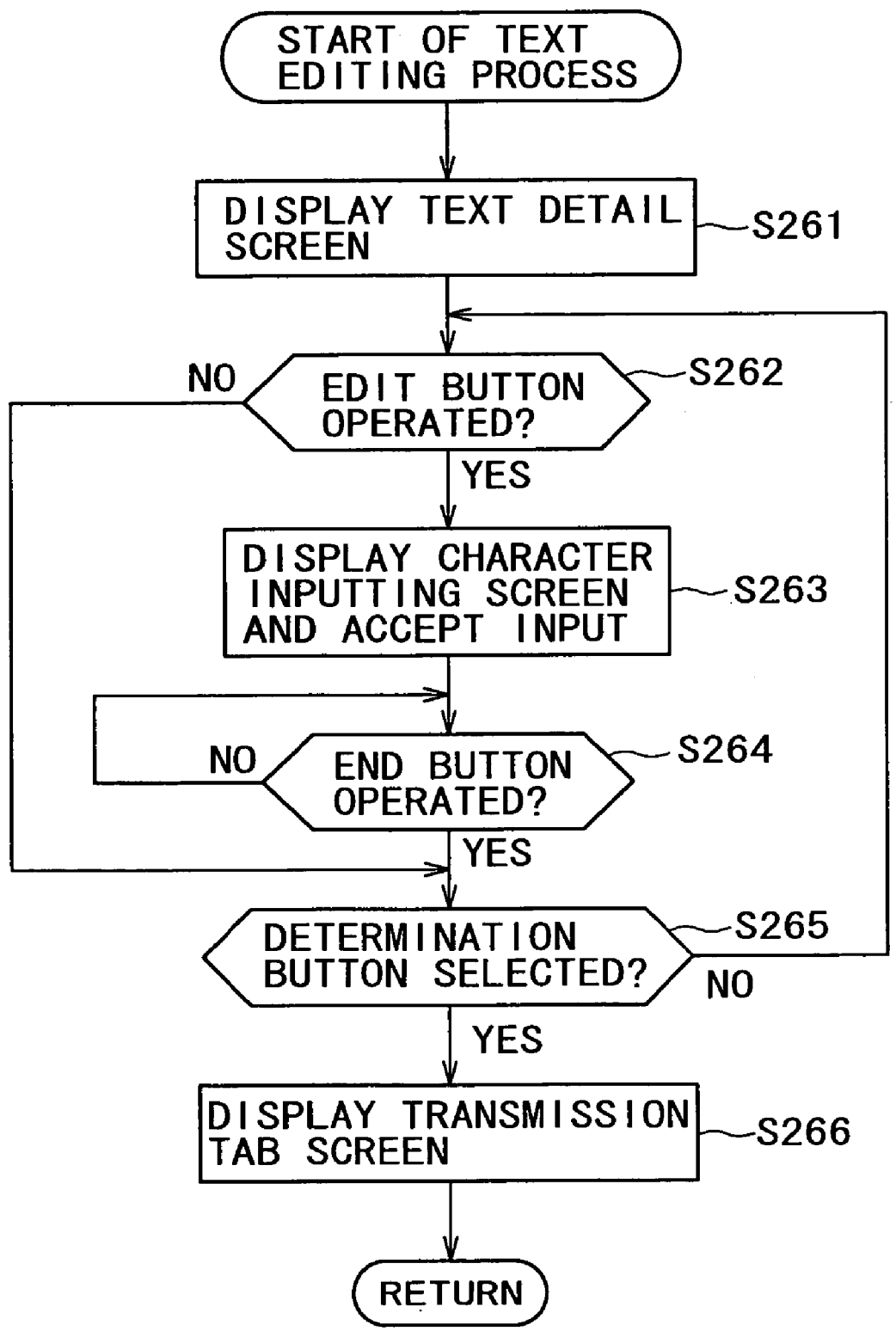
FIG. 29 is a flow chart illustrating details of a text editing process executed at step S208 of FIG. 22.

Subsequently, details of the text editing process performed at step S208 of the flow chart of FIG. 23 are described with reference to a flow chart of FIG. 29.

If the user operates the anchor to operate the text button 346 of the transmission tab screen 341 of FIG. 22, then the CPU 71 first controls the LCD unit 78 to display a text detail screen at step S261.

FIG. 30 is a view showing an example of a display of the text detail screen 451 displayed on the LCD unit 78.

In the example of FIG. 30, the text detail screen 451 includes a text display place 452 for displaying an inputted text, a scroll bar 453 for scrolling the text inputted to the text display place 452 when the text cannot be displayed at a time, an edit button 454 for performing an editing operation for the text, and a determination button 455 for ending the editing of the text.

If the user operates the anchor to operate the edit button 454 of the text detail screen 451, then the character inputting screen 361 shown in FIG. 24 is displayed. The user can utilize the character inputting screen 361 to input a text. After the inputting of the text is completed, the user will operate the end button 366 of the character inputting screen 361 of FIG. 24 to restore the text detail screen.

The inputted text is displayed in the text display place 452 of the text detail screen 451. After the editing of the text comes to an end, the user will operate the determination button 455 to restore the transmission tab screen 341 of FIG. 22.

Referring back to FIG. 29, the CPU 71 having caused the text detail screen 451 to be displayed advances the processing to step S262, at which it discriminates whether or not the user uses the cross key 291 and the determination button 292 to operate the anchor 424 to operate the edit button 454 of the text detail screen 451. If it is discriminated that the edit button 454 is operated, then the CPU 71 advances the processing to step S263, at which it controls the LCD unit 78 to display the character inputting screen 361 of FIG. 24 and accepts an input. Consequently, the user will perform an inputting operation of a text. If the inputting operation is completed, then the user will operate the end button 366 of the character inputting screen 361 of FIG. 24.

At step S264, the CPU 71 discriminates whether or not the user operates the end button 366 of the character inputting screen 361 of FIG. 24, and the CPU 71 waits until it is discriminated that the end button 366 is operated. If it is discriminated that the end button 366 is operated, then the CPU 71 advances the processing to step S265.

On the other hand, if it is discriminated at step S262 that the user does not operate the anchor to operate the edit button 454, the CPU 71 advances the processing to step S265.

At step S265, the CPU 71 discriminates whether or not the user operates the anchor to operate the determination button 455. If it is discriminated that the determination button 455 is not operated, then the CPU 71 returns the processing to step S262 so that the processes at the steps beginning with step S262 are repeated.

On the other hand, if it is discriminated that the user operates the anchor to operate the determination button 455, the CPU 71 advances the processing to step S266, at which it controls the LCD unit 78 to display the transmission tab screen 341 on which a result of the text editing operation is reflected. The CPU 71 having caused the transmission tab screen 341 to be displayed ends the text editing process and advances the processing to step S209 of FIG. 23.

The user can edit a text of an electronic mail in such a manner as described above.

By performing easy operations as described above, the user can cause a GUI for editing a destination, a title, a text or the like or another GUI for performing an operation of attaching an image to an electronic mail to be displayed from the transmission tab screen 341 of FIG. 22.

Further, if the user operates the anchor to operate the WEB album button 334 on the network menu screen 330 of FIG. 21, then a WEB album mode in which image data can be stored into a server connected to the Internet is selected, and a WEB album menu screen is displayed on the LCD unit 78.

FIG. 31 is a view showing an example of a display of the WEB album menu screen displayed on the LCD unit 78.

In the example of FIG. 31, the WEB album menu screen 501 includes an upload button 502 for performing a process of uploading image data, a read/edit button 503 for performing a process of reading or editing a WEB album into which image data have been uploaded, and an end button 504 for ending the WEB album mode.

If the user operates the anchor to operate the upload button 502, then the CPU 71 starts an uploading process.

The uploading process by the CPU 71 is described with reference to a flow chart of FIG. 32.

If the user operates the anchor to operate the upload button 502, then the CPU 71 first controls the LCD unit 78 to display an upload screen at step S301.

Figure 33:
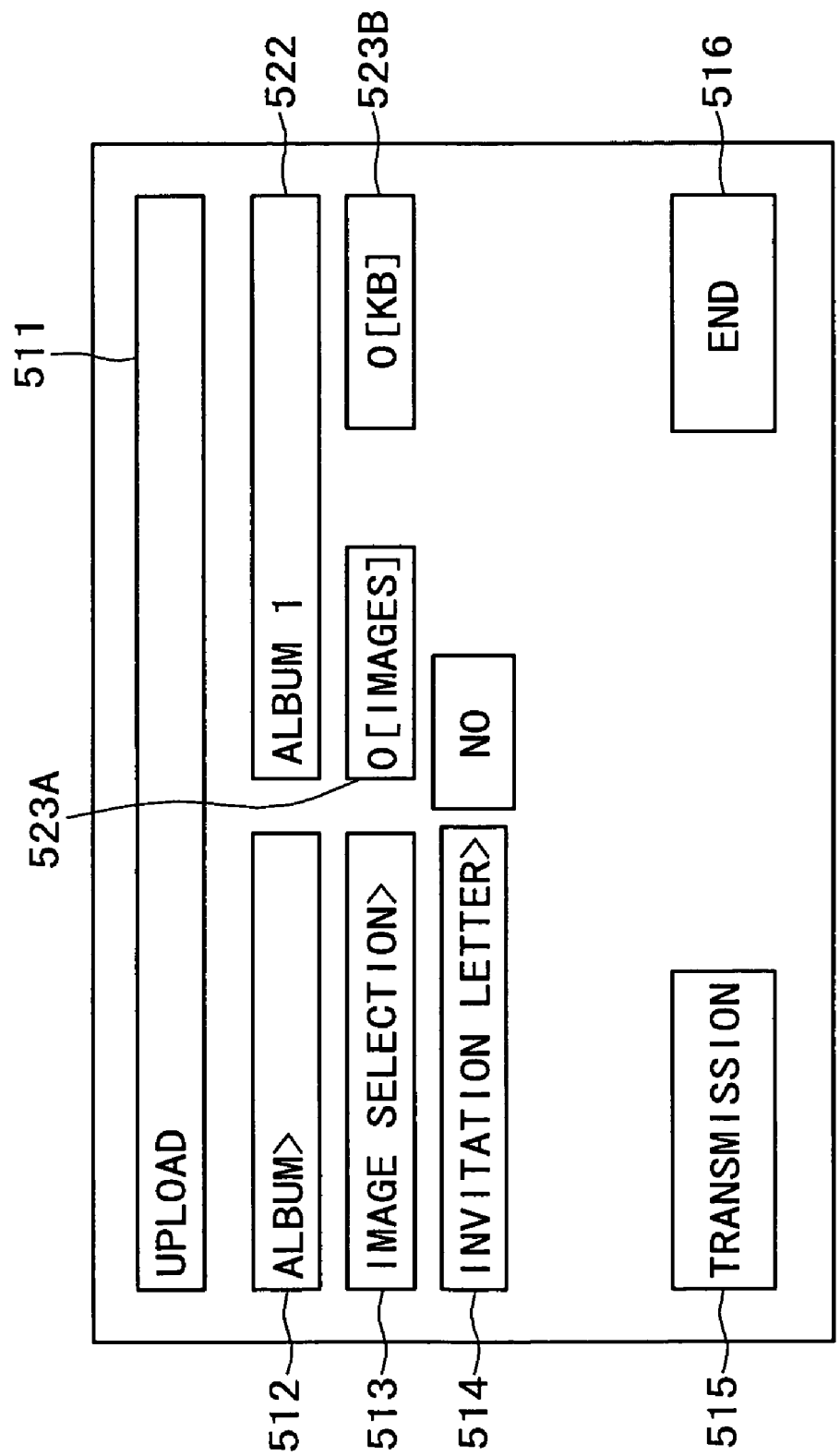
FIG. 33 is a view showing an example of a display of an upload screen displayed on the LCD unit 78.

FIG. 33 is a view showing an example of a display of the upload screen displayed on the LCD unit 78.

In the example of FIG. 33, the upload screen 511 includes an album button 512 for inputting the name of an album of a destination of uploading, an image selection button 513 for selecting an image to be uploaded, an invitation letter button 514 for preparing a letter of invitation, a transmission button 515 for starting uploading, an end button 516 for ending the uploading process, an album name display place 522 for displaying the album name of the destination of transmission, a selected image number display section 523A for displaying the number of image data to be uploaded, and a selected image data size display section 523B for displaying the total data size of the image data to be uploaded.

The user will operate the anchor to operate the buttons to prepare information regarding uploading and perform an uploading process.

Referring back to FIG. 32, the CPU 71 having caused the upload screen 511 to be displayed discriminates at step S302 whether or not the user operates the album button 512 of the upload screen 511. If it is discriminated that the album button 512 is operated, then the CPU 71 advances the processing to step S303, at which it controls the LCD unit 78 to display the character inputting screen 361 of FIG. 24 and accepts an input of the user to determine a transmission destination album. The determined transmission destination album name is displayed in the album name display place 522 of the upload screen 511 of FIG. 33.

As alternative inputting method of an album name, for example, a selection form may be used wherein a list of album names is displayed and the user selects one of the album names from within the list.

After an album name is inputted by the user, the CPU 71 advances the processing to step S304. On the other hand, if it is discriminated at step S302 that the user does not operate the anchor to operate the album button 512, then the CPU 71 advances the processing advances to step S304.

At step S304, the CPU 71 discriminates whether or not the user uses the cross key 291 and the determination button 292 of the inputting section 77 to operate the anchor to operate the image selection button 513. If it is discriminated that the image selection button 513 is operated, then the CPU 71 advances the processing to step S305, at which it performs an upload image selection process. Details of the upload image selection process are hereinafter described. If the upload image selection process comes to an end, the CPU 71 advances the processing to step S306.

On the other hand, if it is discriminated at step S304 that the user does not operate the cross key 291 and the determination button 292 of the inputting section 77 to operate the anchor to operate the image selection button 513, then the CPU 71 advances the processing to step S306.

At step S306, the CPU 71 discriminates whether or not the user operates the anchor to operate the invitation letter button 514. If it is discriminated that the invitation letter button 514 is operated, then the CPU 71 advances the processing to step S307, at which it performs a process of preparing a letter of invitation. After a letter of invitation is prepared, the CPU 71 advances the processing to step S308.

On the other hand, if it is discriminated at step S306 that the user does not operate the anchor to operate the invitation letter button 514, the CPU 71 advances the processing to step S308.

At step S308, the CPU 71 discriminates whether or not the user operates the anchor to operate the transmission button 515. If it is discriminated that the transmission button 515 is operated, then the CPU 71 advances the processing to step S309, at which it establishes a connection to the camcorder image station 41 of the network business center 15 through the Internet 10 to upload image data selected by the upload image selection process by the user.

Figure 34:
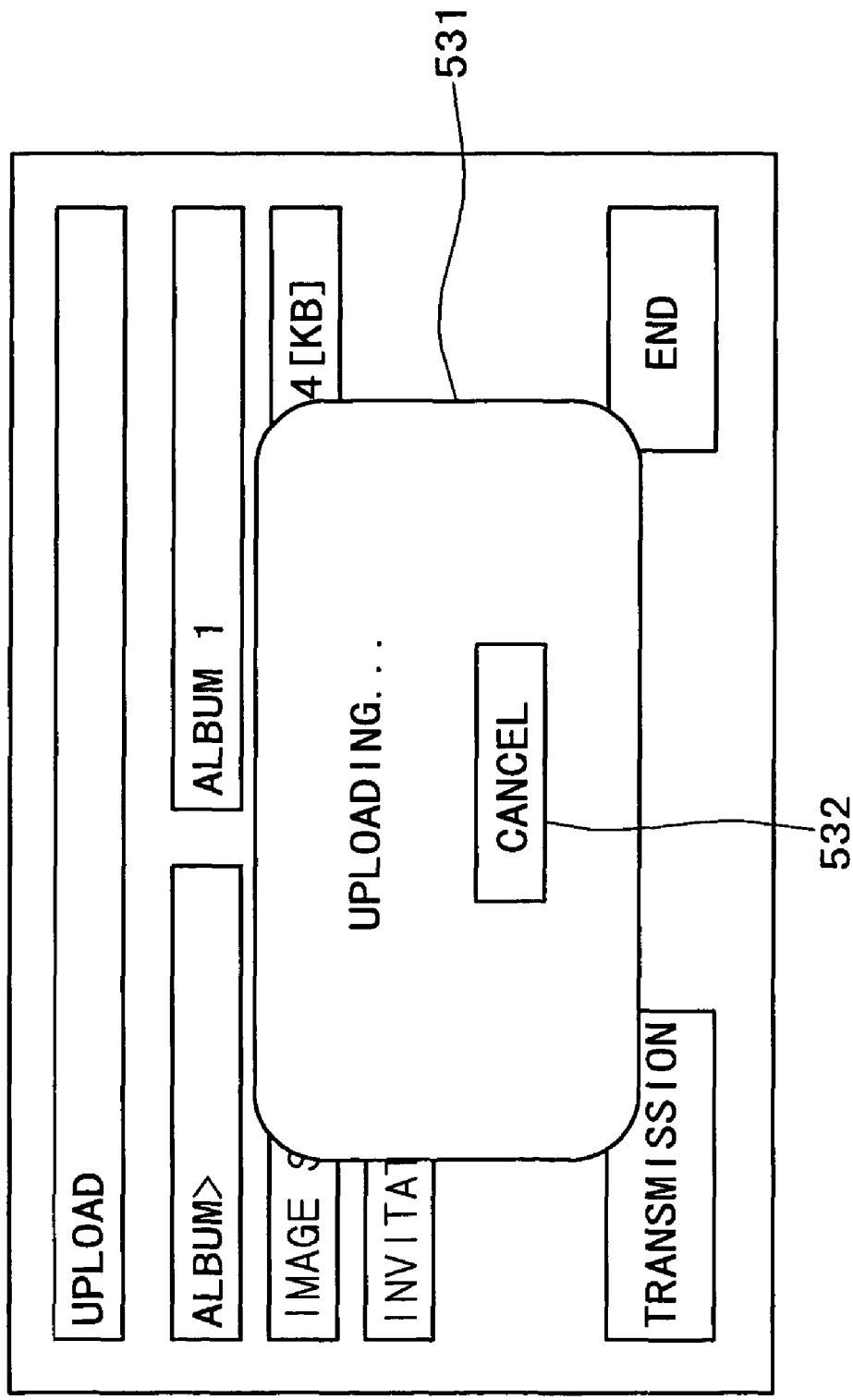
FIG. 34 is a view showing an example of a display of an upload state confirmation screen displayed on the LCD unit 78 during uploading of image data.

FIG. 34 is a view showing an example of a display of an upload state confirmation screen displayed on the LCD unit 78 during uploading of image data.

In the example of FIG. 34, a message of "Uploading" is displayed on the upload state confirmation screen 531, and a cancel button 532 for canceling a process of uploading image data is provided on the upload state confirmation screen 531. The user will refer to the message displayed on the upload state confirmation screen 531 to grasp a proceeding situation of the uploading process. Then, if the user wants to cancel the process of uploading image data, then it will operate the determination button 292 of the inputting section 77 to operate the cancel button 532. When the cancel button 532 is operated, the process of uploading image data is stopped, and the upload state confirmation screen 531 is closed.

Referring back to FIG. 32, the CPU 71 having uploaded the selected image data ends the uploading process.

On the other hand, if it is discriminated at step S308 that the user does not operate the transmission button 515, then the CPU 71 advances the processing to step S310, at which it discriminates whether or not the user operates the anchor to operate the end button 516. If it is discriminated that the end button 516 is operated, then the CPU 71 advances the processing to step S311, at which it causes the network menu screen 330 of FIG. 21 to be displayed and then ends the uploading process.

If it is not discriminated at step S310 that the user operates the end button 516, then the CPU 71 returns the processing to step S302 so that the processes at the steps beginning with step S302 are repeated.

Since the CPU 71 performs an uploading operation in such a manner as described above, the user can operate the upload screen 511 of FIG. 33 to upload image data.

Figure 32:
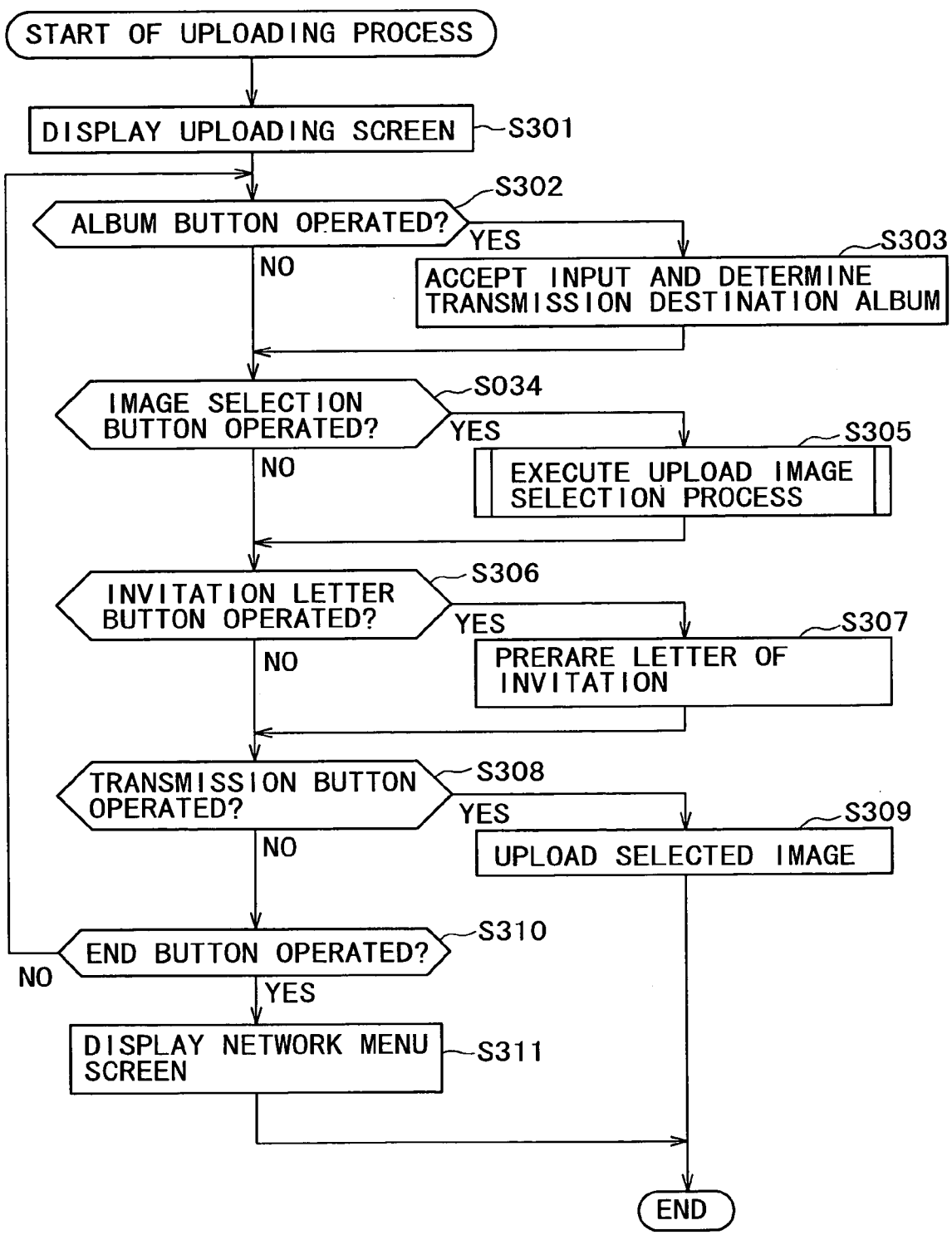
FIG. 32 is a flow chart illustrating an uploading process by the CPU 71.

Subsequently, details of the upload image selection process executed at step S305 of the flow chart of FIG. 32 are described with reference to flow charts of FIGS. 35 and 56.

Figure 35:
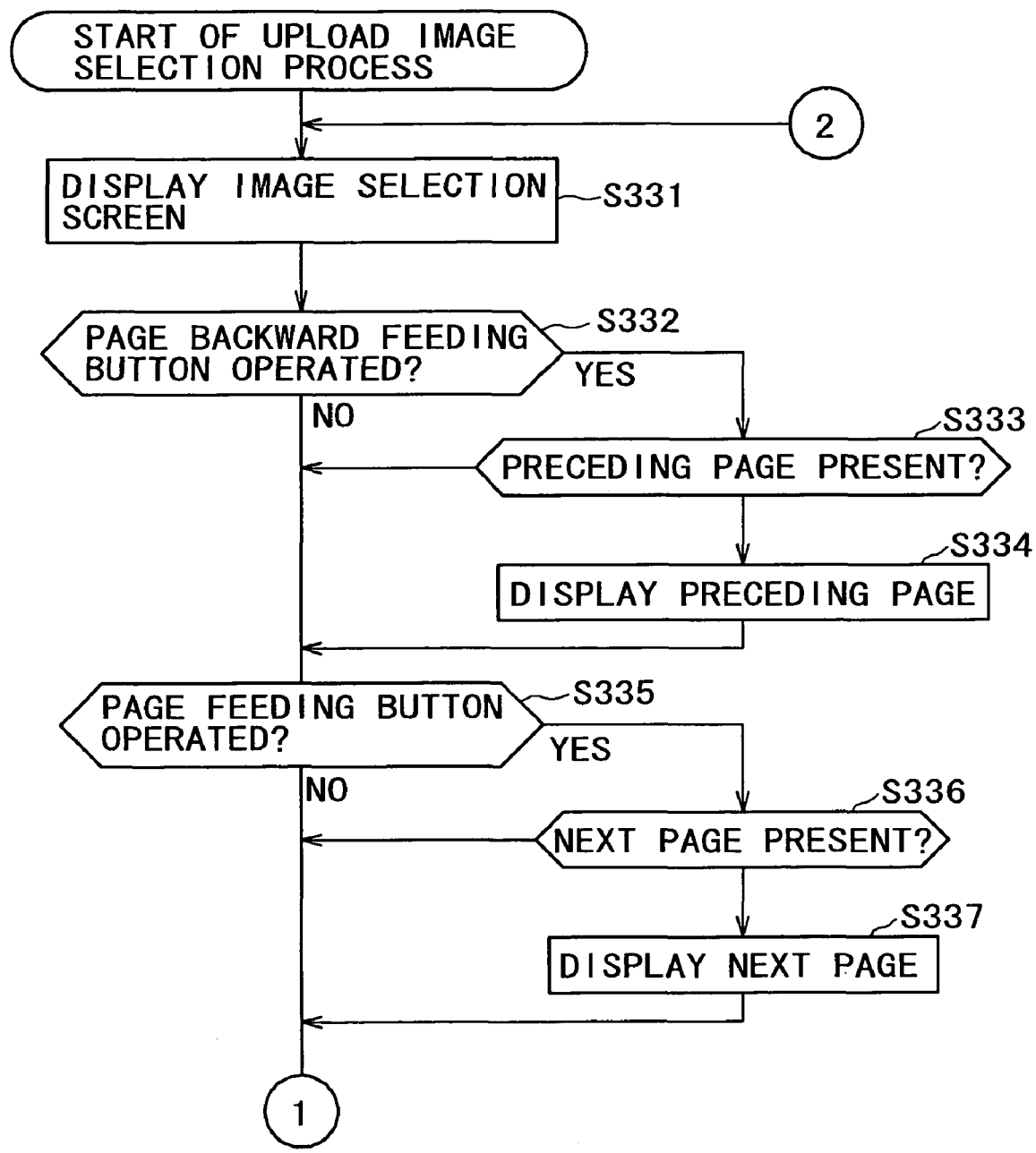
FIG. 35 is a flow chart illustrating details of an upload image selection process executed at step S305 of FIG. 31.

If the user uses the cross key 291 and the determination button 292 of the inputting section 77 to operate the anchor to operate the image selection button 513 on the upload screen 511 shown in FIG. 33, then the CPU 71 first causes the image selection screen 411 shown in FIG. 28 to be displayed at step S331 of FIG. 35. The user will select an image to be uploaded similarly as in the case wherein an image to be attached to an electronic mail is selected.

At step S332, the CPU 71 discriminates whether or not the user operates the page backward feeding button 421 of FIG. 28. If it is discriminated that the page backward feeding button 421 is operated, then the CPU 71 advances the processing to step S333, at which it discriminates whether or not a preceding page to the currently displayed image selection screen 411 is present. If it is discriminated that a preceding page is present, then the CPU 71 advances the processing to step S334, at which it controls the LCD unit 78 to display the preceding page. The CPU 71 having caused the preceding page to be displayed advances the processing to step S335.

If it is discriminated at step S333 that a preceding page is not present, then the CPU 71 advances the processing to step S335. On the other hand, if it is discriminated at step S332 that the user does not operate the anchor to operate the page backward feeding button 421, then the CPU 71 advances the processing to step S335.

At step S335, the CPU 71 discriminates whether or not the user operates the page feeding button 422 of FIG. 28. If it is discriminated that the page feeding button 422 is operated, then the CPU 71 advances the processing to step S336, at which it discriminates whether or not a next page to the currently displayed image selection screen 411 is present. If it is discriminated that a next page is present, then the CPU 71 advances the processing to step S337, at which it controls the LCD unit 78 to display the next page. The CPU 71 having caused the next page to be displayed advances the processing to step S338 of FIG. 36.

Figure 36:
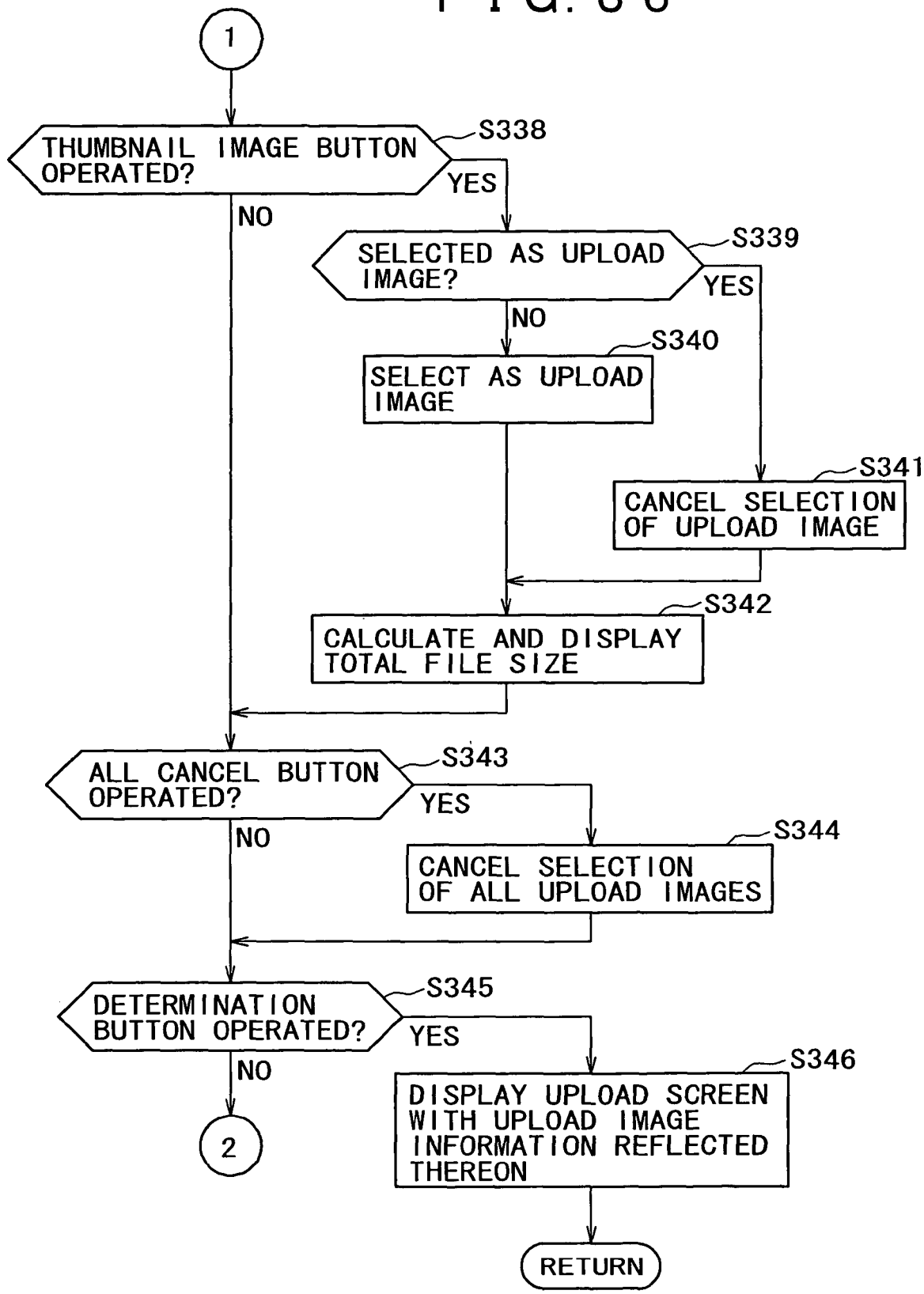
FIG. 36 is a flow chart continuing from that of FIG. 34 illustrating details of the upload image selection process executed at step S305 of FIG. 31.

If it is discriminated at step S336 that a next page is not present, then the CPU 71 advances the processing to step S338 of FIG. 36. On the other hand, if it is discriminated at step S335 that the user does not operate the anchor to operate the page feeding button 422, then the CPU 71 advances the processing to step S338.

At step S338, the CPU 71 discriminates whether or not the user operates the anchor to select one of the thumbnail images 423-1 to 423-6. .If it is discriminated that one of the thumbnail images 423-1 to 423-6 is selected, then the CPU 71 advances the processing to step S339, at which it discriminates whether or not the selected thumbnail image is selected already as an upload image. If it is discriminated that the selected thumbnail image is not selected, then the CPU 71 advances the processing to step S340, at which it selects the thumbnail image as an upload image, and then advances the processing to step S342.

On the other hand, if it is discriminated at step S339 that the selected thumbnail image is selected already as an upload image, then the CPU 71 cancels the selection of the thumbnail image as an upload image and advances the processing to step S342.

At step S342, the CPU 71 calculates the total data size of the selected upload image data and displays the total data size on the total data size display section 412. After the process at step S342 comes to an end, the CPU 71 advances the processing to step S343.

On the other hand, if it is discriminated at step S338 that the user does not operate the anchor 424 to select a thumbnail image, then the CPU 71 advances the processing to step S343.

At step S343, the CPU 71 discriminates whether or not the user operates the anchor 424 to operate the all cancel button 425. If it is discriminated that the all cancel button 425 is operated, then the CPU 71 advances the processing to step S344, at which it cancels the selection of all of the upload images. The CPU 71 having canceled the selection of all of the upload images advances the processing to step S345.

On the other hand, if it is discriminated at step S343 that the user does not operate the anchor 424 to operate the all cancel button 425, then the CPU 71 advances the processing to step S345.

At step S345, the CPU 71 discriminates whether or not the user operates the anchor 424 to operate the determination button 426. If it is discriminated that the determination button 426 is operated, then the CPU 71 advances the processing to step S346, at which it controls the LCD unit 78 to display the upload screen 511 of FIG. 33 such that a result of the image selection operation is reflected. The CPU 71 having completed the process at step S346 ends the upload image selection process and advances the processing to step S306 of FIG. 32.

On the other hand, if it is discriminated at step S345 that the user does not operate the anchor 424 to operate the determination button 426, then the CPU 71 returns the processing to step S331 of FIG. 35 so that the processes at the steps beginning with step S331 are repeated.

The upload image selection process is performed in such a manner as described above, and the user can utilize the image selection button 513 of FIG. 33 to select an upload image.

As described above, also when image data are to be uploaded, the user can select an image to be uploaded by performing simple operations based on the GUI on the upload screen 511 for performing uploading of image data.

While the series of processes described above can be executed by hardware, it may otherwise be executed by software. Where the series of processes is executed by software, a program which constructs the software is installed from a network or a recording medium into a computer incorporated in hardware for exclusive use or, for example, a personal computer for universal use which can execute various functions by installing various programs.

The recording medium is formed as a package medium formed from, as shown in FIG. 3, a magnetic disk 91 (including a floppy disk), an optical disk 92 (including a CD-ROM (Compact Disk-Read Only Memory) and a DVD (Digital Versatile Disk)), or a magneto-optical disk 93 (including an MD (Mini-Disk)), or a semiconductor memory 94 which has the program recorded thereon or therein and is distributed in order to provide the program separately from an apparatus body, or else is formed from a ROM 72 or the like which is provided to a user in a state wherein it is incorporated in the apparatus body in advance and in which the program is recorded.

It is to be noted that, in the present specification, the steps which describe the program stored in a recording medium may be but need not necessarily be processed in a time series in the order as described, and include processes which are executed in parallel or individually without being processed in a time series.

Further, in the present specification, the term system represents an entire apparatus which is composed of a plurality of apparatus.

INDUSTRIAL APPLICABILITY

As described above, according to the information processing apparatus and method, recording medium and program of the present invention, upon transmission of an electronic mail or upon uploading of image data, a user can readily select image data of a plurality of images to be attached to the electronic mail or the image data.

The invention claimed is:

1. An information processing apparatus for uploading image data representing respective images to a remote location server whereat said uploaded image data is stored and managed, said uploading being communicated via a network, said apparatus comprising:
   image acquisition means for acquiring images;
   transmission means for transmitting image data through said network, said image data exhibiting a quantity of data that represents the amount of data that constitutes said image data;
   storage means for storing GUI information for enabling a user to select predetermined applications including an application to select and compose an e-mail, an application to select image data to be uploaded, or an application to connect said transmission means to said network;
   a display unit for displaying the GUI information, including a menu of said applications, said display unit having a thumbnail section for displaying plural thumbnail images selected by the user, a data size section for displaying the total data size of all of the thumbnail images selected by said user and a title section for displaying a user-generated name to identify an album comprised of images corresponding to said selected thumbnail images;
   input means operable by said user for operating the GUI information, said input means including an inputting section operable by said user to generate the name of said album for display in said title section and to select a plurality of desired thumbnail images;
   cancellation means selectively operable by said user to cancel the selection of all of said thumbnail images that had been selected prior to commencing transmission of said thumbnail images; and
   control means for controlling said transmission means to transmit the album name displayed in said title section and all of said selected thumbnail images to said remote server via said network.

2. An information processing apparatus according to claim 1, wherein the GUI information is operable by said user to select image data representing a plurality of images to be uploaded.

3. An information processing method for an information processing apparatus to upload image data representing respective images to a remote location server whereat said uploaded image data is stored and managed, said uploading being communicated via a network, said method comprising the steps of:
   acquiring images;
   transmitting image data through said network, said image data exhibiting a quantity of data that represents the amount of data that constitutes said image data;
   storing GUI information for enabling a user to select predetermined applications including an application to select and compose an e-mail, an application to select image data to be uploaded, or an application to connect said transmission means to said network, said GUI information enabling said user to select acquired images and to connect to said network;
   displaying the GUI information, including a menu of said applications, a thumbnail section for displaying plural thumbnail images selected by the user. a data size section for displaying the total data size of all of the thumbnail images selected by said user and a title section for displaying a user-generated name to identify an album comprised of images corresponding to said selected thumbnail images;
   operating the GUI information to generate the name of said album for display in said title section and to select a plurality of desired thumbnail images;
   selectively canceling, by said user, the selection of all of said thumbnail images that had been selected prior to commencing transmission of said thumbnail images; and
   transmitting the album name displayed in said title section and all of said selected thumbnail images to said remote server via said network.

4. A recording medium for storing a computer-readable program for controlling an information processing apparatus to upload image data representing respective images to a remote location server whereat said uploaded image data is stored and managed, said uploading being communicated via a network, said program controlling the steps of:
   acquiring images;
   transmitting image data through said network, said image data exhibiting a quantity of data that represents the amount of data that constitutes said image data;
   storing GUI information enabling a user to select predetermined applications including an application to select and compose an e-mail, an application to select image data to be uploaded, or an application to connect said transmission means to said network, said GUI information enabling said user to select acquired images and to connect to said network;
   displaying the GUI information, including a menu of said applications, a thumbnail section for displaying plural thumbnail images selected by the user, a data size section for displaying the total data size of all of the thumbnail images selected by said user and a title section for displaying a user-generated name to identify an album comprised of images corresponding to said selected thumbnail images;
   operating the GUI information to generate the name of said album for display in said title section and to select a plurality of desired thumbnail images;
   selectively canceling, by said user, the selection of all of said thumbnail images that had been selected prior to commencing transmission of said thumbnail images; and
   transmitting the album name displayed in said title section and all of said selected thumbnail images to said remote server via said network.

5. A program embodied in a recording medium to control an information processing apparatus to upload image data representing respective images to a remote location server whereat said uploaded image data is stored and managed, said uploading being communicated via a network said program executing the steps of: acquiring images; transmitting image data through said network, said image data exhibiting a quantity of data that represents the amount of data that constitutes said image data; storing GUI information enabling a user to select predetermined applications including an application to select and compose an e-mail, an application to select image data to be uploaded, or an application to connect said transmission metals to said network, said GUI information enabling said user to select acquired images and to connect to said network; displaying the GUI information, including a menu of said applications, a thumbnail section for displaying plural thumbnail images selected by the user, a data size section for displaying the total data size of all of the thumbnail images selected by said user and a title section for displaying a user-generated name to identify an album comprised of images corresponding to said selected thumbnail images; operating the GUI information to generate the name of said album for display in said title section and to select a plurality of desired thumbnail images; selectively canceling, by said user, the selection of all of said thumbnail images that had been selected prior to commencing transmission of said thumbnail, images; and transmitting the album name displayed in said title section and all of said selected thumbnail images to said remote server via said network.

6. An information processing apparatus for uploading image data representing respective images to a remote location server whereat said uploaded image data is stored and managed, said uploading being communicated via a network, said apparatus comprising:

an image acquirer for acquiring images;

a transmitter for transmitting image data through said network, said image data exhibiting a quantity of data that represents the amount of data that constitutes said image data;

a store for storing GUI information for enabling a user to select predetermined applications including an application to select and compose an e-mail, an application to select image data to be to be uploaded, or an application to connect said transmission means to said network;

a display for displaying the GUI information, including a menu of said applications, said display having a thumbnail section for displaying plural thumbnail images selected by the user, a data size section for displaying the total data size of all of the thumbnail images selected by said user and a title section for displaying a user-generated name to identify an album comprised of images corresponding to said selected thumbnail images;

an input unit operable by said user for operating the GUI information, said input unit including a manually operable inputting section operable by said user to generate the name of said album for display in said title section and to select a plurality of desired thumbnail images;

a cancel selector selectively operable by said user to cancel the selection of all of said thumbnail images that had been selected prior to commencing transmission of said thumbnail images; and a controller for controlling said transmitter to transmit the album name displayed in said title section and all of said selected thumbnail images to said remote server via said network.

* * * * *